(12) United States Patent
Haeberle et al.

(10) Patent No.: US 7,337,191 B2
(45) Date of Patent: Feb. 26, 2008

(54) METHOD AND SYSTEM FOR OBTAINING SERVICE RELATED INFORMATION ABOUT EQUIPMENT LOCATED AT A PLURALITY OF SITES

(75) Inventors: Brad Haeberle, Arlington Heights, IL (US); Michael Dehart, Keller, TX (US); Karen Wisniewski, Palatine, IL (US); Doug Emery, Mundelein, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 375 days.

(21) Appl. No.: 10/628,978

(22) Filed: Jul. 28, 2003

(65) Prior Publication Data

US 2005/0080805 A1    Apr. 14, 2005

Related U.S. Application Data

(60) Provisional application No. 60/398,956, filed on Jul. 27, 2002, provisional application No. 60/441,838, filed on Jan. 22, 2003.

(51) Int. Cl.
*G06F 17/00* (2006.01)

(52) U.S. Cl. .................... 707/104.1; 707/3; 707/10; 707/101; 707/102; 707/103 R

(58) Field of Classification Search .............. 707/1–10, 707/100–104.1, 200–206; 715/500–529
See application file for complete search history.

(56) References Cited

U.S. PATENT DOCUMENTS

| | | | |
|---|---|---|---|
| 6,141,595 A | 10/2000 | Gloudeman et al. | 700/83 |
| 6,363,422 B1 | 3/2002 | Hunter et al. | 709/224 |
| 6,457,015 B1 | 9/2002 | Eastham | 707/102 |
| 6,487,457 B1 | 11/2002 | Hull et al. | 700/17 |
| 6,598,056 B1 | 7/2003 | Hull et al. | 707/104.1 |
| 6,604,061 B2 | 8/2003 | Takahashi et al. | 702/188 |
| 6,721,689 B2 | 4/2004 | Markle et al. | 702/188 |
| 6,745,200 B2 | 6/2004 | Starkey | 707/102 |
| 6,917,859 B2 | 7/2005 | Masui et al. | 700/286 |
| 6,954,737 B2 | 10/2005 | Kalantar et al. | 705/50 |
| 7,117,432 B1 | 10/2006 | Shanahan et al. | 715/512 |
| 2002/0026343 A1 | 2/2002 | Duenke | 705/8 |
| 2002/0143872 A1 | 10/2002 | Weiss et al. | 709/204 |
| 2002/0147746 A1 | 10/2002 | Lee | 707/513 |
| 2002/0178100 A1* | 11/2002 | Koveos | 705/36 |

* cited by examiner

*Primary Examiner*—Isaac Woo

(57) ABSTRACT

A method and system is provided for communicating service and maintenance information about equipment located at distributed building sites. A customer web portal is provided with a database for storing the equipment service information. The web portal provides an efficient way of determining the service activity for equipment located at distributed sites without the need for maintaining service related information at each site. The user can also obtain information about individual service orders and service agreements for individual pieces of equipment.

13 Claims, 30 Drawing Sheets

SIEMENS site360 Home    site360 Ordering    Help  Contact Us  Sitemap

Search for... [  ] go >

♦ Request Service

Service Central Fileshare Administration Log Out

| Home | >... >.. >Open Calls >Service Order

→ Service Activity
  → Open Calls
    Closed Calls
    Custom Reports
  TSP Contracts
  Equipment
  Sites
  Request Service

Appointment

Below is the detailed information for the single appointment selected for this call.

Summary
The summary provides an overview of information related to the selected appointment.

| | | | |
|---|---|---|---|
| Service Order No. | 030321-0852 | Contract No. | |
| PO Number | 200303974 | Customer Name | Demonstration Customer |
| Site | S7 MULTIPURPOSE (B251013) | Branch | ATLANTA |
| | | Lead Technician | Steve Conti |
| Appointment No. | 030321-0852|0001|1|240097 ATL | Skill Type | Fitter Journeyman |
| Open Date | 4/23/03 | | |
| Closed Date | | | |
| Appointment Status | TENTATIVE | | |

Equipment
The table below lists the equipment that service was performed on for this particular appointment. If no data appears, service has not yet been performed.

No Data Available.

FIG. 14

SIEMENS site360 Home  site360 Ordering   Help  Contact Us  Sitemap

Search for... [  ] go >

Service Central Fileshare Administration Log Out

| Home | >-- >-- >Closed Calls

🛠 Request Service

→ Service Activity
    Open Calls
→ Closed Calls
    Custom Reports
    TSP Contracts
    Equipment
    Sites
    Request Service

Closed Calls

Below is an overview of all service activities with a 'closed' status (this includes completed, closed and paid calls). Clicking Display filter criteria and selecting different filtering criteria options allows you to modify the report.

→ Display Filter Criteria  →🖥

Export to: 📊.xls  📄.doc  📄ASCII

800

Item 1-5 of 178  810

| Open Date | Order No. | Status | Site | Description | Call Type | System | PO No. |
|---|---|---|---|---|---|---|---|
| 4/16/03 | ▲030307-3331 | Complete | SZ EAST POINT (B425013) | PM | Preventive | Mechanical | 200305028 |
| 4/16/03 | ▲030403-0116 | Complete | UPS 35 Glenlake Fire | TAMPER TROUBLE | Preventive | Fire | |
| 4/10/03 | ▲030307-3327 | Complete | SZ FAIRBURN (B323013) | PM | Preventive | Mechanical | |
| 4/10/03 | ▲030410-0128 | Complete | SZ MULTIPURPOSE (B323013) | CHANGE THE BELTS | Preventive | Mechanical | |
| 4/9/03 | ▲030307-3325 | Complete | SZ SOUTHWEST (B440013) | PM | Preventive | Mechanical | 200304882 |

▲1-5  ▲6-10  ▲11-15  ▲16-20  ▲21-25  ▲26-30  next →

→ Display Equipment / Contract No.

SIEMENS site360 Home   site360 Ordering   Help   Contact Us

Search for... [v] [_____] go >

Service Central  Fileshare  Administration  Log Out
| Home | >-- >Request Service 🔔 Request Service Service Activity
TSP Contracts
Equipment
Sites
→ Request Service

Request Service

This page is for submitting online service requests.

For emergency or after-hours service, please call your local branch office.

*Indicates required field.

| | |
|---:|:---|
| Request Type* | [Request for service ▼] |
| Priority* | [Next Business Day ▼] |
| Select Site* | [_____▼] |
| OR Enter Site | [_____] |
| | [Load Site Equipment] |
| Select Equipment* | [_____▼] |
| OR Enter Equipment* | [_____] |
| Location* | [_____] |
| Description* | [_____] |
| PO No. | [_____] |
| Last Name | Wallace |
| First Name | Michael |
| E-mail* | [michael.wallace@siemens.com] |
| Phone | [847-215-1000] |

FIG. 20

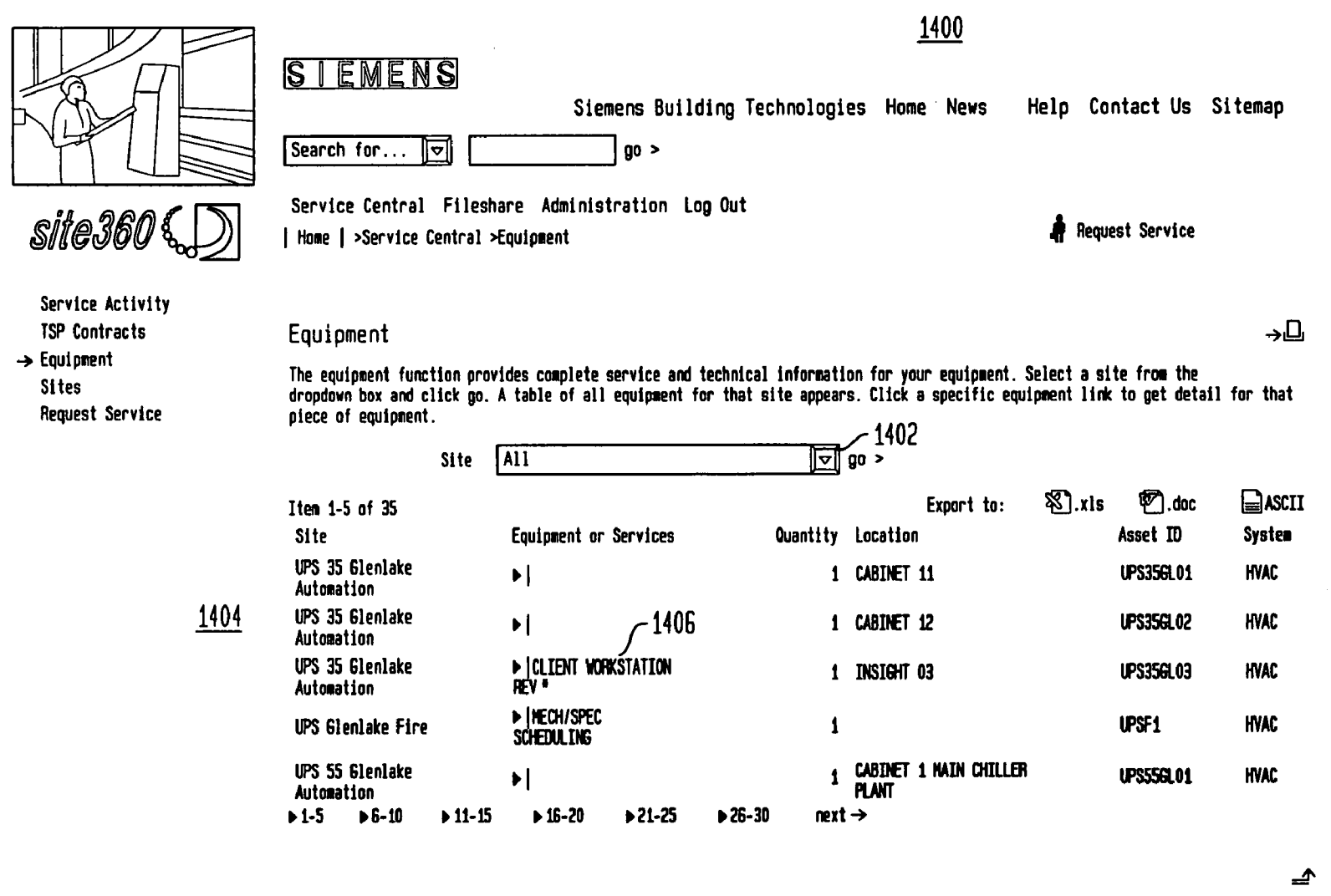

Equipment

Siemens Building Technologies — Home · News · Help · Contact Us · Sitemap

Search for... [go >]

Service Central  Fileshare  Administration  Log Out

| Home | >Service Central >Equipment

Request Service

The equipment function provides complete service and technical information for your equipment. Select a site from the dropdown box and click go. A table of all equipment for that site appears. Click a specific equipment link to get detail for that piece of equipment.

Site [All ▼] [go >] 1402

Export to: .xls  .doc  ASCII

Item 1-5 of 35

| Site | Equipment or Services | Quantity | Location | Asset ID | System |
|---|---|---|---|---|---|
| UPS 35 Glenlake Automation | ▶ | 1 | CABINET 11 | UPS35GL01 | HVAC |
| UPS 35 Glenlake Automation | ▶ | 1 | CABINET 12 | UPS35GL02 | HVAC |
| UPS 35 Glenlake Automation | ▶ CLIENT WORKSTATION REV * | 1 | INSIGHT 03 | UPS35GL03 | HVAC |
| UPS Glenlake Fire | ▶ MECH/SPEC SCHEDULING | 1 | | UPSF-1 | HVAC |
| UPS 55 Glenlake Automation | ▶ | 1 | CABINET 1 MAIN CHILLER PLANT | UPS55GL01 | HVAC |

▲1-5  ▲6-10  ▲11-15  ▲16-20  ▲21-25  ▲26-30  next→

Service Activity
TSP Contracts
→ Equipment
Sites
Request Service site360

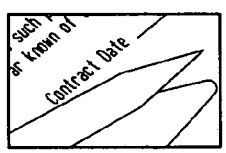

1600

SIEMENS

Siemens Building Technologies  Home  News  Help  Contact Us  Sitemap

Search for... [▼] [          ] go >

Service Central  Fileshare  Administration  Log Out
| Home | >Service Central >Equipment >Individual Contract          🛠 Request Service Service Activity
→ TSP Contracts
  Active Contracts
  Expiring Contracts
  Cancelled Contracts
  Expired Contracts
  Custom Reports
Equipment
Sites
Request Service Individual Contract The individual contract function provides complete detail for the selected contract. For example, which sites and equipment are covered, contract duration, and service history under the specified contract.

Summary
The summary provides and overview of information related to the selected service contract.

1610

| | | | |
|---|---|---|---|
| Contract No. | PB-1394 | PO No. | |
| Status | Active | | |
| Effective Date | 1/1/03 | SBT Branch | ATLANTA |
| Renewal Date | 12/31/03 | Secondary Contact | Jacquelyn Brewer |
| Time to Renewal | 313 Days | Coverage Type | FULL COMPREHENSIVE |
| Service Technician/ Account Engineer | M. Kevin Mote | System | HVAC |

Description          FULL COMPREHENSIVE

1630 — Service Activity
Use the following links to get service history or scheduled service information.  1620
→ Service History   → Scheduled Services
                                          1640
1650  Detail
Clicking an existing service contract displays the contract in its entirety.

1660  Sites & Equipment
The table below lists sites and equipment covered under this service contract. Select the desired site from the left side of the table. The equipment covered by the contract for the selected site will then display on the right side of the table.

Item 1-3 of 3    📊.xls  📄.doc  📄ASCII   Item 1-3 of 3
Site                                        Equipment
▶ UPS 35 Glenlake Automation ─── 1670       |
▶ UPS 55 Glenlake Automation                |
▶ UPS 55 Glenlake Automation                |CLIENT WORKSTATION REV*

FIG. 23

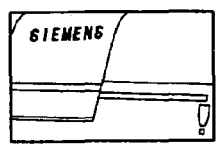

SIEMENS
Siemens Building Technologies    Home  News    Help  Contact Us  Sitemap

1700

Search for... [ ] [  ] go >

Service Central  Fileshare  Administration  Log Out
| Home | >Service Central >Equipment >— >Service Order ♦ Request Service → Service Activity
  Open Calls
  Closed Calls
  Custom Reports
  Selected Services
TSP Contracts
Equipment
Sites
Request Service Service Order                                                            →🖨

Below is the data for the single service activity you have selected.

Summary
The summary provides an overview of information related to the selected service order number.

| | | | |
|---|---|---|---|
| Service Order No. | 020625-0955 | Customer Name | Demonstration Customer |
| PO Number | | Contract No. | ▶PB-1394 ~1720 |
| Site | UPS 35 Glenlake Automation | | |
| | | System | HVAC |
| 1710 Status | Closed | Open Date | 7/3/02 |
| Call Type | Preventive | Closed Date | 7/5/02 |
| Request Type | generated | | |
| Problem Type | MAINTENANCE | | |
| Call Priority | Next Scheduled Visit | | |

Detail
The problem and resolution area provides a description of the requested service and what action has been taken to resolve the issue.

1730  Problem Description
Resolution         JEFF C. 7/3/02-BUILDING ON GENERATOR AT THIS TIME.

Further Information
Use the following links to get further equipment, call, or appointment information.

1740  go to  ⌄ Equipment⟋  ⌄ Call Log⟋                    → Appointments⟍
Equipment        ~1750     ~1760                              ~1770
The table below lists equipment that was serviced on the selected order number.

Item 1-3 of 3                                    Export to:  📊.xls  📄.doc  🗎ASCII

|  | Equipment Quantity | Location | Asset ID |
|---|---|---|---|
| Equipment Name | | | |
| 1780 ▶| | 1 | CABINET 11 | UPS35GL01 |
| ▶| | 1 | CABINET 12 | UPS35GL02 |
| ▶|CLIENT WORKSTATION REV" | 1 | INSIGHT 03 | UPS35GL03 |

Call Log
The table below lists all activities logged to the selected service order number.

1790  No Data Available.

FIG. 25

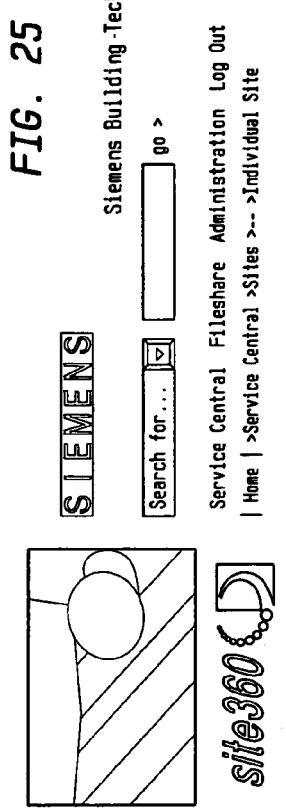

SIEMENS

Siemens Building Technologies    Home  News    Help  Contact Us  Sitemap

Search for....  [ ] go >

Service Central Fileshare Administration Log Out
| Home | >Service Central >Sites >... >Individual Site                              ♦ Request Service

Individual Site  _1900_

The Individual site function provides detailed data for a single, selected, site enabling you to easily supervise and track all service activity for that site.

→ Display Filter Criteria  →▢

Service Activity Summary
The summary provides an overview of all service activity for this site grouped by status, call type, and system type.

_1910_  Site        SZ COLLEGE PARK      Call Type _1930_
                    (B320013)            Preventive   ▲3 _1965_
                                         Corrective   ▲1 _1970_

_1920_  Call Status                      System _1940_
        Open        ▲1 _1950_            HVAC         ▲1 _1975_
        Closed      ▲3 _1960_            Mechanical   ▲3 _1980_ site360

Service Activity
TSP Contracts
Equipment
→ Sites
Request Service

Service Activity Detail _1985_
The table below lists detail for the individual site, as well as the service activity information associated with it. Clicking any table header will sort the data by that column. You can also export the table content to another format by clicking the desired file format symbol to the right.

Export to:  📊.xls  📄.doc  ASCII

Item 1-4 of 4
_1990_
| Order No. | PO No. | Description | Call Status | Call Type | Open Date | System |
|---|---|---|---|---|---|---|
| ▲021001-0210 | PC-02SC87314 | ANNUAL CHILLER PM | Closed | Preventive | 10/7/02 | System |
| ▲021003-0275 | PC02SC87314 | INSTALL 2 CHECK VALVES & CLEAN | Closed | Preventive | 10/15/02 | Mechanical |
| ▲021016-0068 | PC-02SC87314 | PM REPAIRS | Closed | Preventive | 10/7/02 | Mechanical |
| ▲030206-0002 |  | this is a test for the call t* | Open | Corrective | 2/6/03 | HVAC |

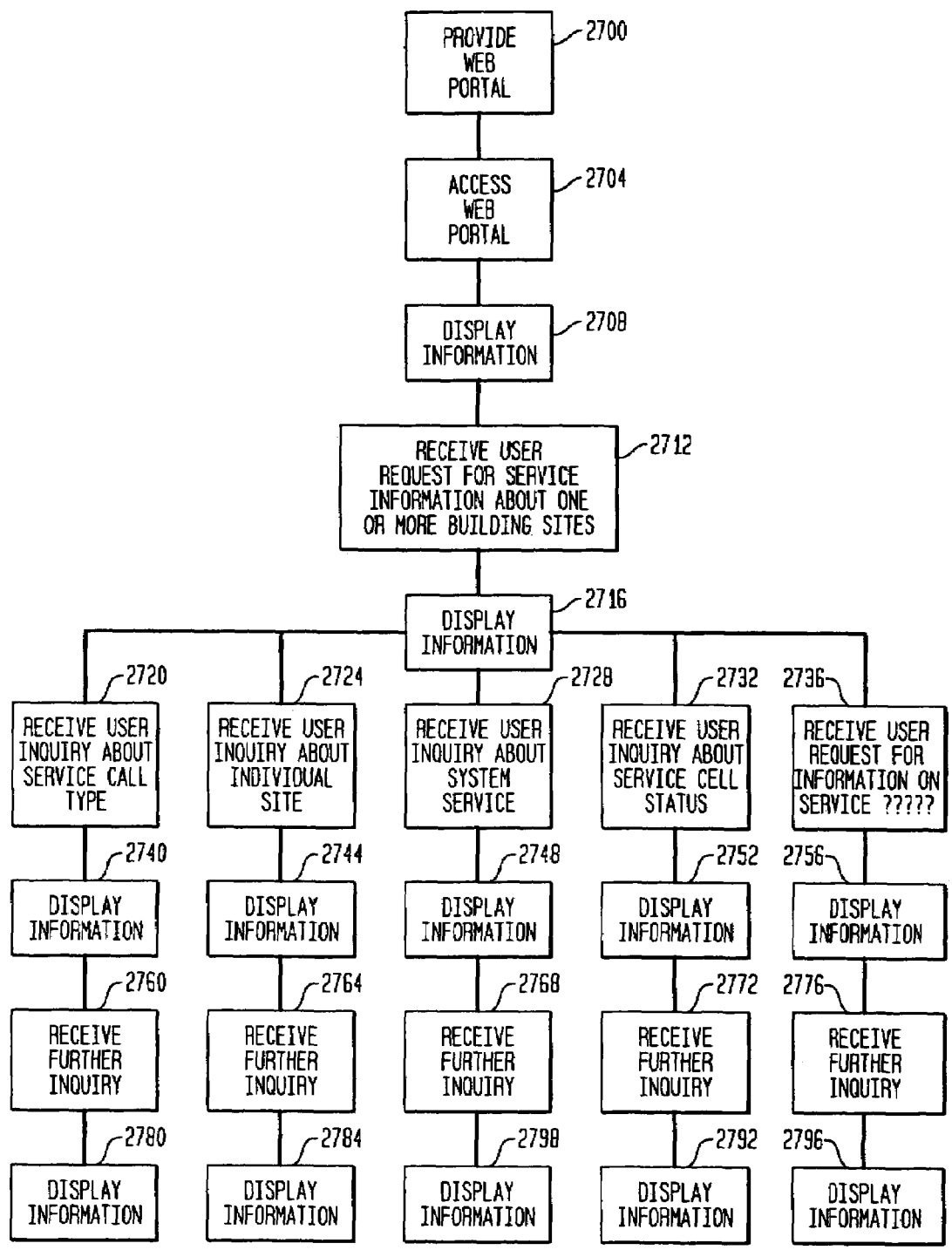

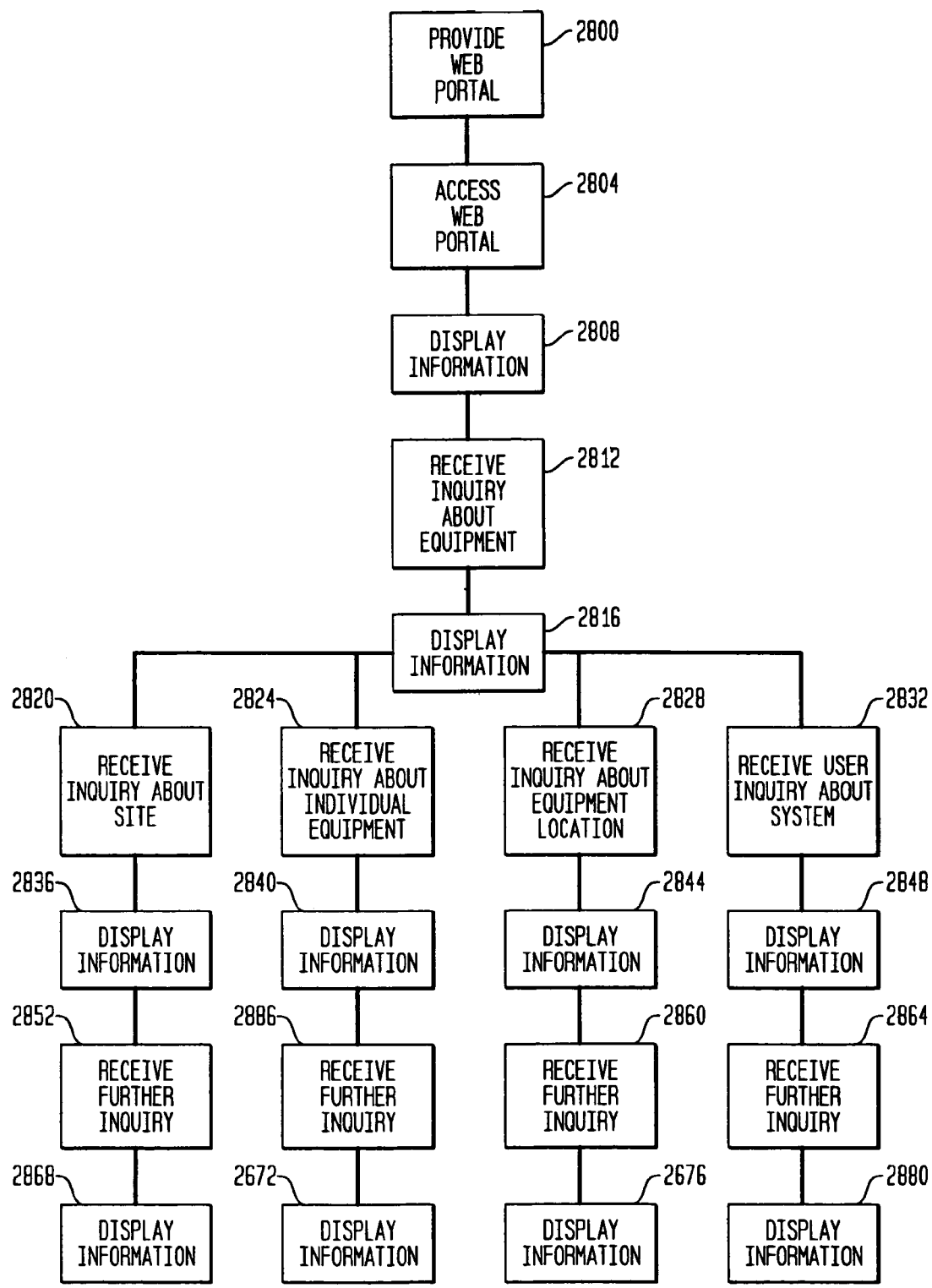

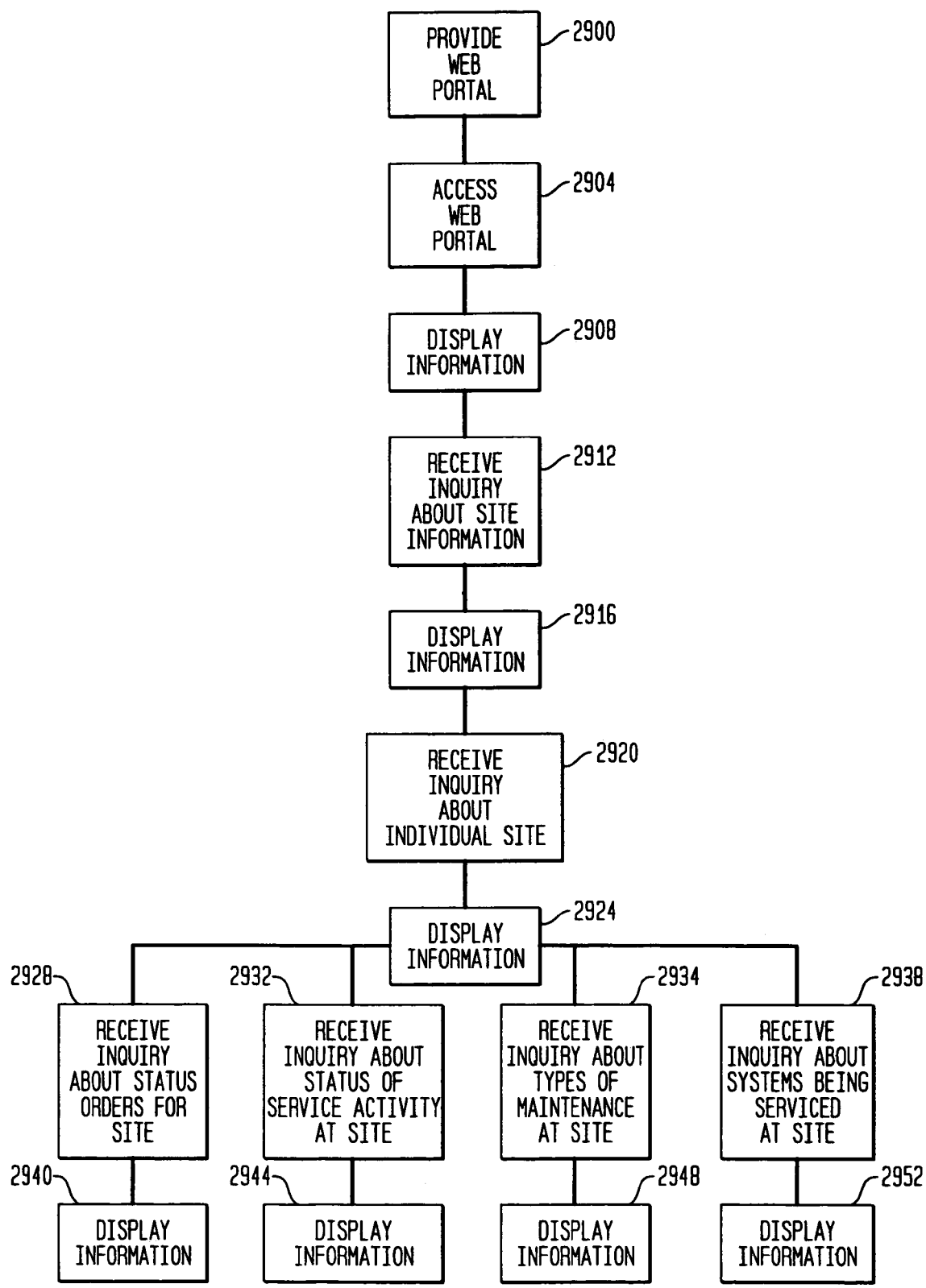

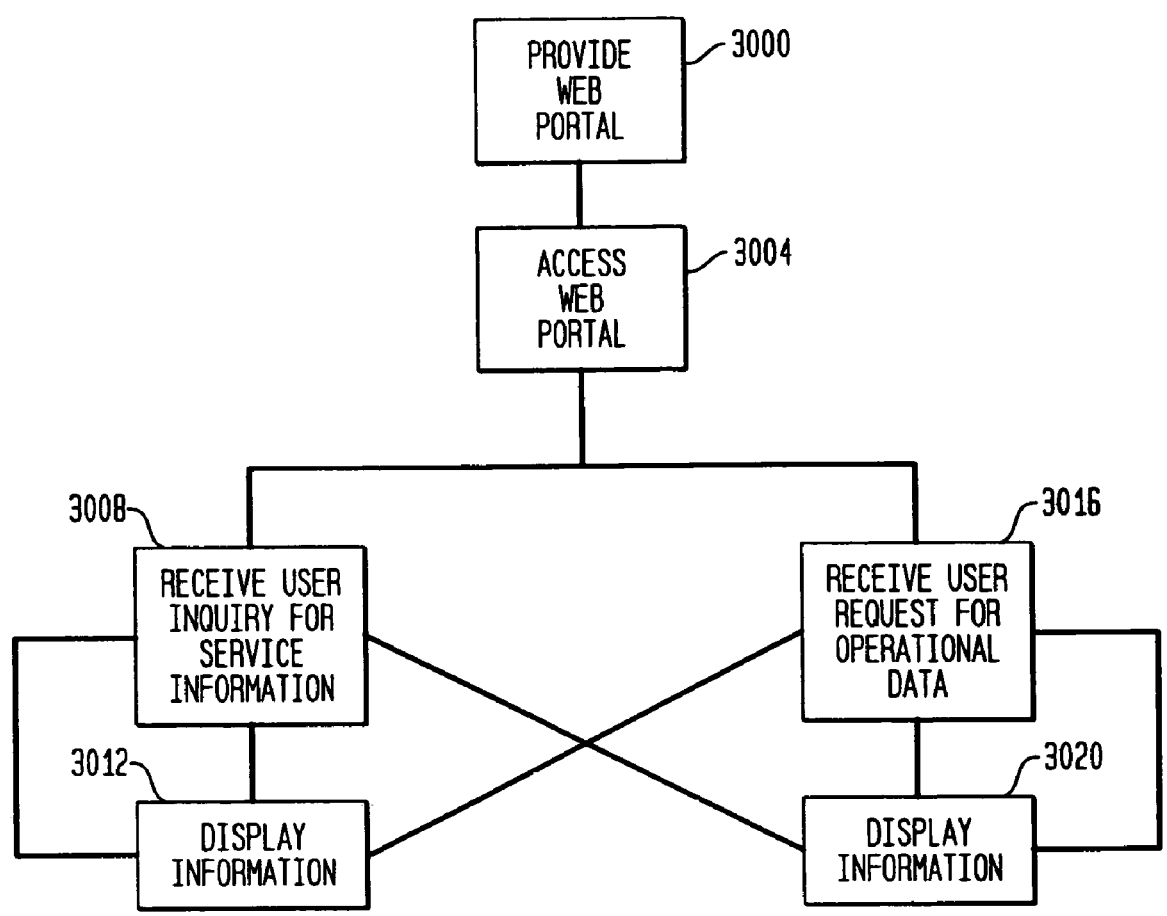

METHOD AND SYSTEM FOR OBTAINING SERVICE RELATED INFORMATION ABOUT EQUIPMENT LOCATED AT A PLURALITY OF SITES

This application claims the benefit of U.S. Provisional Patent Application Ser. No. 60/398,956 filed Jul. 27, 2002 titled "Customer Web Portal" which is incorporated by reference herein, and also claims the benefit of U.S. Provisional Patent Application Ser. No. 60/441,838 filed Jan. 22, 2003 titled System and Method for Developing and Processing Building System Control Solutions, which is also incorporated by reference herein.

RELATED APPLICATIONS

The following patent applications cover subject matter related to the subject matter of the present invention: "Method and System for Obtaining Service Contract Information" U.S. patent application Ser. No. 10/629,226; "Method and System for Obtaining Service Information about one or more Building Sites" U.S. patent application Ser. No. 10/628,977; "Method and System for Obtaining Information about a Building Site"; U.S. patent application Ser. No. 10/629,229; "Method and System for Obtaining Operational Data and Service Information for a Building Site" U.S. patent application Ser. No. 10/628,976.

FIELD OF THE INVENTION

The present invention allows users online access to service information for their one or more building sites, enabling them to place online service requests, access work orders, service histories and service contract details.

BACKGROUND OF THE INVENTION

Most commercial properties include a number of building systems that monitor and regulate various functions of the building for the comfort and well-being of the tenants. These building systems include security systems, fire control systems, and heating and ventilation (HVAC) systems. HVAC systems are used to regulate the temperature and flow of air throughout a building. The air conditioning for a building typically includes one or more chillers for cooling air and more or more heaters for warming air. Fans distribute air conditioned by a chiller or heater into a duct system that directs the flow of air to the various rooms of a building. Dampers are located within the duct system to variable control an opening to a branch of a duct system or to a room.

Such systems and mechanical devices commonly require preventative and corrective maintenance. Facility managers and technicians do not have an efficient method to track the activities of services providers to improve the effectiveness of facility operations. This is especially true of facilities such as factories or facilities such as Universities which have numerous sites requiring different types of maintenance. There is a need to limit the overhead associated with service related paperwork with a more efficient means for tracking service activity.

Control systems for building systems are increasingly reliant upon computer and network technology. Microcontrollers and the like may be used to operate and maintain actuators for damper position as well as controlling fan speed. These local controllers provide operational data to an overall system controller. The overall system controller is typically a computer that analyzes data received from local controllers to determine whether system parameters, such as set points, are being maintained. If the system parameters are not being met, the system controller issues command messages to one or more local controllers to adjust local control so the system parameters may be achieved. In some previously known systems, the system controller communicates with the local controllers over a computer network. Most typically, the hardware platform for the network is an Ethernet platform and the network software supporting communication over the network is a TCP/IP layer. This structure supports communication between a control application program executing on the system controller and an application program executing on the local controller. However, the computer network does not provide remote building system engineers with access to the application programs.

In order to monitor a building system, a system controller typically receives status data from local controllers periodically or as conditions change. These data may be analyzed by the system controller to determine whether commands for local controllers should be generated and then discarded or stored after being analyzed. These stored data may be characterized as historical data for the building system. These historical data may be very useful for determining response characteristics of a building system or for other system modeling uses. However, these historical data are typically stored at the building site. Consequently, these data are inaccessible to building system engineers unless a copy of these data are generated and migrated to another location for analysis and modeling purposes. Additionally, previously known systems require the system controller to store the operational data in a database. Thus, the system controller absorbs an administrative overhead for managing the storage of operational data in a local database. This administrative overhead may include programming logic to convert data values to a common format or to manipulate the application programming interface (API) of a database.

In an effort to reduce this administrative overhead, systems have been developed that segregate the informational aspects of a building control system from the control aspects. For example, U.S. Pat. No. 6,141,595 discloses a system that includes an information layer and a control layer that interface with a group of databases. The control layer enables control applications to access attribute data for the purpose of operating control devices in a building. Optimization applications update the control attributes for improved control of the building system. The information layer supports communication with applications through the Internet or other network interfaces so external users may access the data in the databases. The control and optimization applications, on the other hand, query the databases through their respective APIs. Thus, control and optimization application developers need to be able to program the access methods for the various databases into their applications. The control layer provides a standardized interface for the control and optimization applications to the components of the building system.

While the system of the '595 patent separates external user communication with the databases from the control and optimization application communication with the databases, it still requires the control and optimization application developers to program database access methods in the applications. Consequently, the building engineers are required to be knowledgeable regarding a variety of database APIs. Furthermore, the control and optimization applications are not readily accessible to the external users. Also, the system of the '595 patent assumes that the control and optimization applications are tested and fully developed before being installed between the control layer and the system database APIs. However, the system of the '595 patent does not provide an environment for accessing data to model and to test an application before being installed on the system.

In addition to the data limitations of previously known systems, there are other issues that compound the problem of developing applications for building systems. Typically, companies that manage buildings have to somehow obtain the programs for controlling a building system from an outside source. Otherwise, the building manager would need to keep a team of system engineers and programmers for application development. The system engineers understand the building system components and develop control algorithms and load predictors for control of the system. However, they typically do not have adequate knowledge of software methodologies and programming techniques to generate and test computer programs efficiently. Likewise, the computer programmers and software engineers are able to design, develop, test, and integrate computer programs but they do not possess the building system expertise to appropriately apply control theory to building system components. Typically, however, companies that manage building systems do not have sufficient resources to support a team of system engineers and software engineers. Accordingly, they employ a staff of technicians to maintain and operate the building system components and seek to obtain the application solutions for their system needs from outside sources.

One way in which building management companies may seek to obtain application solutions is to purchase general purpose control programs for systems comprised of components similar to the ones in a particular building system. However, no such general purpose solution exists as the uniqueness of building system topology, component composition, and other factors make it impracticable to develop and adapt a general solution for most building system needs efficiently.

Another way to obtain application solutions is to procure the services of an building system engineering service. Typically, these companies employ both building system engineers and computer engineers for developing and testing application solutions for building systems that are owned and operated by one or more building management companies. The obstacles to the development and testing of application solutions for different building systems are significant. For one, building systems use different types of controllers, actuators, and networks for communicating between building system components. As a result, the computer engineers need to be able to write programs in a variety of control program languages and implement controls for and obtain data from a plethora of devices that require commands and supply data in different formats. Additionally, the computer engineers must be able to work with system engineers to convert the control algorithms and load predictors designed by the system engineers into computer software. This human interface may require an extensive amount of time and significant expenditure of resources to take a building system solution from its system design to implementation in a building system. This expenditure is especially exacerbated when, for example, system engineers who specialize in load prediction and system engineers who specialize in HVAC systems both need to have their designs implemented by the same computer engineering team for a building system. This need puts pressure on the computer engineering team to develop expertise for writing software in different operational fields without proven expertise in each of those fields.

One way that a computer engineering team meets these types of needs is to obtain various software packages from software vendors and then adapt them for implementing a piece of an application solution. For example, a neural network package may be purchased and adapted to implement a load forecasting component of a building system solution. Another package that may be required is a data base management system for storing and querying data required for application solution support. Other packages may include data computational programs for various building system parameters and other engineering tools for particular building systems. However, one problem with this approach is the need to integrate disparate packages that may be programmed in different languages operating on different platforms. Latency and data compatibility issues may arise during the integration efforts.

What is needed is a system for facilitating the development of application solutions with reduced compatibility issues.

What is needed is a system for developing application solutions that does not require implementation of solution components in a variety of computer languages.

What is needed is a system for reducing the need for human interaction in translating a system engineering design into an operational solution.

What is needed is a system that provides support for diverse fields of operational expertise.

What is needed is a system for developing control applications without requiring knowledge of a database API being programmed into the application.

What is needed is a system for developing control applications that permit the real-time and historical data for a building system to be used for application modeling and testing without requiring the installation of the application in the system. What is needed is a way to enable external users to access applications.

What is needed is a customer web portal that provides facility managers the ability to obtain service information about a plurality of sites without having to obtain information from each site individually.

SUMMARY OF THE INVENTION

The above limitations of previously know systems and methods may be overcome by a system and method implemented in accordance with the principles of the present invention. The present invention provides a customer web portal (CWP) enabling external users to access reports, work orders, service histories and service contract details that may be generated by applications operating on a database or data mart. This Web access enables data mining applications and the historical database to be maintained at a common site rather than requiring every building site to have its own database and data mining applications.

The delivery through CWP may include identifying Web-based components that are coupled to an application communication over the Internet or other computer network. Web based components transparently communicate data over the Internet or other computer network.

The present invention will allow users to access their service information, enable them to place online service requests, access work orders, service histories and service contract details. The present invention will allow users oversee service activities-more efficiently. The present invention's reporting capabilities provide a comprehensive data archive of service information. Online queries are available to authorized users to check service activity by location, by equipment, by status, or for a specific time frame. This serves as an effective communication vehicle for building occupants and management.

Using the present invention, a user may place a service request by clicking a service request icon, filling in the service details in a form displayed to the user, and then clicking submit. The request may then be automatically transmitted to the appropriate field office service coordinator who can schedule the service. The user may then be notified by email of the service ticket number, and a service activity web page will display the service request status.

The present invention includes a service activity display for a users facilities regardless of their original, whether submitted electronically or over the phone. The status of each request is updated continually so information is timely. This allows the user to check the status of a service request at any time. Information may be organized by call status, call type, systems type and site or building to allow the user to effectively manage information. The present invention further includes custom reporting when more specific report parameters are needed. Online queries are available to authorized users to check service activity by location, by equipment, by status or for a specific time frame.

The present invention further provides service contract information for all customer sites. The user may display lists of active contracts and contracts coming up for renewal, as well as retrievable archives of all expired and cancelled contracts. Complete, individual service contracts can be viewed onscreen or exported to PDF format for printing.

In another embodiment, the inventive system includes a systems design verifier and a system design converter for converting a verified system design into an application solution. The systems design verifier is configured to receive a system design, preferably written in a language for describing a system and control logic for the system. The language is selected as being familiar to system engineers for identifying system components and requirements. For example, XML files may be used to identify HVAC components and the duct layout in a system. Verification of a system design includes checking the syntax of the system description and logic. The system design converter generates computer program statements for components in the building system to implement the system design.

The system of the present invention may also include a tool interface for coupling to the system design converter so that the design converter may generate computer program statements for use of a computer tool. These computer tools include data organization tools, such as data base management systems, data filtering tools, statistical analysis packages, and analytical methods, such as linear programming modules. The design converter generates the computer programming statements for manipulating the interface to a computer tool to pass data to a tool for the generation and return of data. For example, the design converter may provide variable values for a set of equations and a forcing vector to a linear programming tool and receive a set of equation coefficients. The system may also include an interface for external computer program modules that may be included in the application solution. For example, a proportional-integral-derivation control loop module may be accessed through the external program interface.

The system of the present invention that includes the interfaces for computer tools and external programs enables the system design converter to convert a system design into computer program statements that may be executed by one or more components of a building system. The tools interface enables the design converter to obtain data for incorporation in the program being generated by the converter and the external program interface permits the design converter to include statements for using external programs in the program being generated. These interfaces also provide testing support for a generated program. Once tested, the generated program may be stored in a file for transmission or other transfer to a building site for installation in one or more components of the building system.

The system of the present invention enables system engineers to design building system control logic that is converted into a computer program without requiring the system engineers to communicate system design expertise to software engineers or to write computer programs. Likewise, the computer engineers are able to focus on selecting computer tools and external programs that may be used to support application solution development and then programming the interfaces to make the tools and external programs accessible to the programs generated by the converter. The system design converter, tools interface, and external program interface comprise an application infrastructure.

The inventive system includes a database, a data provider interface for converting between a common database access method and a database application programming interface (API), and an application infrastructure for coupling an application program to the data provider interface so that an application having common database access method instructions may access the database through the data provider interface. The application infrastructure of the present invention provides an interface to the data provider that does not require the system engineer to provide database instructions that conform to the API for the database. Instead, the data provider converts the common database access method instructions of the system design program to access method instructions that conform to the API for the database. Likewise, the responses from the database received by the data provider through the database API are converted into responses compatible with the common database access method instructions so the application may receive the requested data. The infrastructure and data provider interface of the present invention are especially advantageous when the database is comprised of a plurality of databases with each database having a different database API. This interface structure enables, for example, a historical database, or data mart, to have a different structure and interface that better supports data mining than a real-time database interface. For example, the data mart may use a star or snowflake data organization to facilitate data mining while the real-time database retains a more conventional Standard Query Language (SQL) interface. The application infrastructure allows the application programmer to develop an application without requiring knowledge of the two database structures and their particular APIs. Consequently, a building system control application developer may concentrate on those aspects of an application that provide efficient control over the building parameters affected by the application.

The application infrastructure of the present invention may also include Web-based components for coupling application solutions to the Internet or other computer networks that use the TCP/IP or other communication schema of the Internet. Again, the system engineer need not be proficient in the details of the implementation of the network access. Instead, the engineer defines the application as requiring Web-based communication and an appropriate Web-based interface component is provided so the application and/or its output may be accessed over the Internet or other computer network. Preferably, the application infrastructure also includes Windows-based components for communicating with other applications that run under a version of the Windows operating system. Again, the engineer need not be proficient in the application-to-application communication techniques under the Windows system as the Windows-based components provide that communication interface through a more generic interface through which the applications may be coupled.

The above-described architecture of the present invention enables system engineers to develop application programs without requiring the engineers to know the subtleties and nuances of specific database APIs and communication protocols. Instead, the engineers may focus on the engineering requirements of the building system being controlled by the application and the effects of the control actions of the application. This segregation of the communication and database access components into the application infrastructure and data provider interface empower building system engineers to generate application solutions more efficiently. Furthermore, the Web-based components may be used to make the applications available to users through a customer web portal (CWP). The CWP enables the applications to be developed by a service organization at a common site where the database is maintained so the applications may be developed and tested with a wide variety of data. The applications once tested and verified as being field ready, may be downloaded through the CWP to a particular building site and installed as an application for execution by a system controller or local controller in the building system. Also, the CWP may be used by external users to access reports or other summaries that may be generated by applications operating on the data mart. This Web access enables data mining applications and the historical database to be maintained at a common site rather than requiring every building site to have its own database and data mining applications.

The system of the present invention may also include a configuration data utility for developing a system design program representative of a building system and associating configuration data with the components identified in the file structure generated by the configuration utility. Preferably, the configuration data utility uses Extended Markup Language (XML) to organize the components of a building system in a file/folder structure. The utility also associates configuration data, such as that related to devices and sensors, with component folders in the XML structure. This utility enables an application program to traverse the file/folder structure to obtain and to process data for building system components.

The system of the present invention may also include a data collector interface for coupling external data sources to the database. The data collector interface converts data from the native format for an external data source to one that is compatible with the structure of the database in which the data is stored. This data conversion function of the data collector interface enables the database or databases of the present invention to be coupled to a plurality of external data sources without requiring that all of the external data sources conform to one particular database structure. Furthermore, the data collector interface includes transaction services that generate the instructions for a database API that are required to store the data in the database. Thus, data sources from diverse locations may be coupled to a database at a common site. Consequently, a significant accumulation of historical data may be obtained for a data mart component of the database, which further enhances the value of the data mining applications at the common site. However, the data provider interface also supports the segregation of the collected data into different databases so control application programs may be developed from the data originated at the particular building site for which the application is being developed.

The system of the present invention may also include a scheduling service that may be coupled to the application programs and the data collector interface. In accordance with schedule data, the scheduling service activates data collector interface components to interrogate external data sources for data that may then be converted for storage in the database or data mart component maintained at the common site. In this manner, the database and data mart are automatically updated. In a similar manner, the scheduling service activates application programs for operating on the data stored in the database and/or data mart component to generate reports that may be accessed through the CWP or Windows-based communication methods. Thus, the system of the present invention not only facilitates the development of application programs for building systems but it enables remote users to obtain timely analysis of the data from a building system without the need to maintain application programs or a database at a building site.

The inventive method includes verifying an application definition to identify data for implementing in the application defined by the application definition and converting the identified data into computer program statements. The computer data conversion includes program statements using computer tools and external programs. The definition verification includes verifying the syntax of the application definition.

The application data conversion may include converting common database access method instructions into database API queries, and converting the responses to the database API queries into common database access method responses. The application data conversion for data base access enables application programs to have a common interface to a database or databases without requiring the system engineer to provide database instructions that conform to the API for the database. Instead, the data provider of a tool interface converts the common database instructions of an application definition to an access method that conforms to the API for the database. Likewise, the responses from the database through the database API are converted into the common database instructions so the application may receive requested data. The conversion of the present invention is especially advantageous when the database is comprised of a plurality of databases with each database having a different database API. The conversion allows a system engineer to develop an application without requiring knowledge of the two database structures and their particular access interfaces. Consequently, a building system control application developer may concentrate on those aspects of the application that provide efficient control over the building parameters affected by the application.

The data identification may be comprised of obtaining a list of point types that are used as inputs for the application and mapping each point type to an actual control system point name. Preferably, the control system point names are contained in a configuration data file compiled by a configuration data utility. The actual control system point names are used to generate the API queries for retrieving data from a database for the application. The application definition may be verified to identify common calculation components that may be used to generate outputs for the application. The outputs of the application may be delivered to external users through the CWP or stored in the database through the data provider.

The delivery through CWP may also include identifying Web-based components that are coupled to an application communication over the Internet or other computer network. Again, an application developer need not be proficient in the details of the implementation of the network access. Instead, Web-based components transparently communicate data over the Internet or other computer network. Delivery to another Windows application, preferably, includes identifying Windows-based components that are coupled to an application for communication between applications running under a version of the Windows operating system. Again, the application programmer need not be proficient in the application-to-application communication techniques under the Windows system as the Windows-based components provide that communication interface through a more generic interface through which the applications may be coupled.

The output of an application may include an application or a group of set points that may be delivered to an external application through the CWP. The CWP enables the applications to be developed by a service organization at a common site where the database is maintained so the applications may be developed and tested with a wide variety of data. The applications once tested and verified as being field ready, may be downloaded through the CWP to a particular building site and installed as an application executed by a system controller or local controller in the building system. Also, the CWP may be used by external users to access reports or other summaries that may be generated by applications operating on the data mart. This Web access enables data mining applications and the historical database to be maintained at a common site rather than requiring every building site to have its own database and data mining applications.

The configuration data files may be developed as structures with file and folder names that correspond to building system components having associated data that identify the contexts of the components. Preferably, the file and folder structures are developed using Extended Markup Language (XML) to organize the components of a building system. The context data includes manufacturer data, engineering units, location data, and other building system data. These data enable an application program to traverse a configuration data file to obtain data for building system components so building system control applications may be tested.

The method of the present invention may also include determining an activity is scheduled for execution and activating the activity. The activity may include obtaining data from an external data source and converting the data so the data are compatible with a database in which the data are stored. This source data conversion enables the database or databases of the present invention to be coupled to a plurality of external data sources without requiring that all of the external data sources conform to one particular database structure or representative schema. Furthermore, the data conversion enables data sources from different building sites to be coupled to a database at a common site. Consequently, a significant accumulation of historical data may be obtained for the data mart, which further enhances the value of the data mining applications at the common site. However, the source data conversion also supports the segregation of the collected data into different databases so control application programs may be developed from the data originated at the particular building site for which the application is being developed.

Activities that may be activated by scheduling include application programs for operating on data stored in a database and/or data mart to generate reports that may be accessed through the CWP or Windows-based communication methods. As previously noted, the scheduling may also include activating interrogation of external data sources for data so the data may be converted for storage in the database or data mart maintained at the common site. In this manner, the database and data mart are automatically updated. Thus, the method of the present invention not only facilitates the development of application programs for building systems but it enables remote users to obtain timely analysis of the data from a building system without the need to maintain application programs or a database at the building system site.

The system and method of the present invention facilitates development of application solutions with reduced compatibility issues.

The system and method of the present invention do not require implementation of solution components in a variety of computer languages.

The system and method of the present invention reduce the need for human interaction in translating a system engineering design into an operational solution.

The system and method of the present invention provide support for diverse fields of operational expertise.

The system and method of the present invention enable the development of control applications without requiring knowledge of a database API being programmed into the application.

The system and method of the present invention permit real-time and historical data for a building system to be used for application development without requiring the installation of the application in a particular building system controller.

The system and method of the present invention provides a mechanism that enables external users to access applications.

The system and method of the present invention provide database access for application programs that does not require database API programming.

These and other advantages and features of the present invention may be discerned from reviewing the accompanying drawings and the detailed description of the invention.

BRIEF DESCRIPTION OF THE DRAWINGS

The present invention may take form in various components and arrangement of components and in various methods. The drawings are only for purposes of illustrating exemplary embodiments and alternatives and are not to be construed as limiting the invention.

FIGS. 10-25 are depict screen shots illustrating how a user may obtain information about work orders, service histories and service contract details;

FIGS. 26-30 are flow charts showing exemplary methods incorporating the principles of the present invention.

DETAILED DESCRIPTION OF PREFERRED EMBODIMENTS

The present invention provides a customer web portal (CWP) enables external users to access reports or other summaries that may be generated by applications operating on the data mart. This Web access enables data mining applications and the historical database to be maintained at a common site rather than requiring every building site to have its own database and data mining applications. At the same time, the present invention will allow users to access their service information, enable them to place online service requests, access work orders, service histories and service contract details. The present invention will allow users oversee service activities more efficiently. The CWP 48 also offers resources such as user forums and email.

Figure 1:
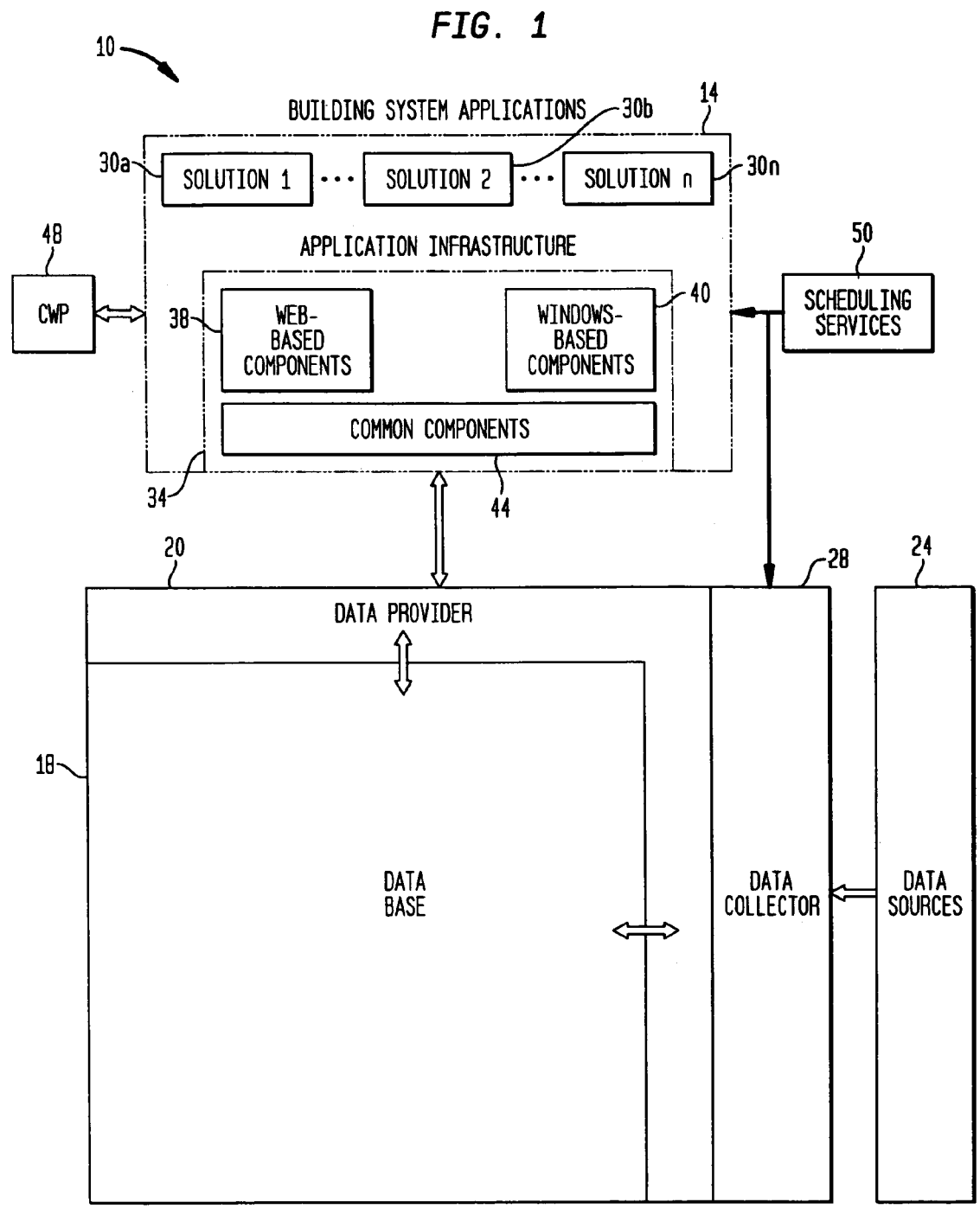
FIG. 1 is a block diagram of a system made in accordance with the principles of the present invention.

A system 10 incorporating the principles of the present invention is shown in FIG. 1. System 10 includes building system applications 14 that are coupled to database 18 through data provider 20. External data sources 24 are coupled to database 20 through data collector 28. Application programs 30a-30n that implement solutions for a building system are coupled to application infrastructure 34. Application infrastructure 34 includes common components 44 for coupling application programs 30a-30n to data provider 20 as well as to web-based components 38 and Windows-based components 40. Web-based components 38 may be used by an application program 30a-30n to communicate with a remote application over a TCP/IP computer network such as the Internet. Preferably, TCP/IP computer network communication is performed through customer web portal (CWP) 48. Likewise, Windows-based components 40 may be used by an application program 30a-30n to communicate with a remote application through a Windows operating system. Although components 40 are described as being Windows-based, components 40 may also include components for communicating with other applications through a Unix, Mac OS, Linux, or other operating system. System 10 may also include scheduling services 50 for activating application programs 30a-30n or data collector 28 to perform their tasks in accordance with scheduling data.

Application solutions 14 execute on a computer having sufficient resources to support the applications as well as web-based components 38 and Windows-based components 40. For example, a computer system having at least a Pentium 4 processor operating at 1.8 GHz with 128 MB of RAM and a 60 GB hard drive is required for application space execution. The operating system of the computer may be used to provide security for applications 14. For example, the Windows operating system may be used to check user names, verify passwords, provide encryption, and control other access paths for activating applications. This security is available for those users who connect to the operating system of the computer and attempt to log on the computer. Applications 14 may also participate in system security by verifying user authorization to execute an application, by not storing unencrypted passwords, and by using secure procedures for accessing database 18. Likewise, file and folder permissions may be set to restrict user access to specific folders and files for application activation and data.

Web-based components 38 may communicate with users external to the site where the applications are executing. For these users, CWP 48 also requires security/authentication functions. Preferably, this security is supported by a lightweight directory access protocol (LDAP) database and a single sign-on may be used to allow access to applications that may be activated by users over the Internet. Single sign-on may be used to permit users to switch between applications without having to logoff and log on again.

Infrastructure 34 is shown in more detail in FIG. 1B. Infrastructure 34 includes an application definition verifier 56, a system design converter 58, a computer tool interface 60, and an external program interface 62. Application definition verifier 56 parses and verifies the syntax of an application definition as discussed in more detail below. Preferably, an application definition is written in a language or graphical interface that may be used to describe components in a system as well as the control logic or algorithm for a building system. For example, the topology of a HVAC system and the configuration data for the components of the system may be described with an XML schema as described below. These data may be converted by system design converter 58 into computer statements for implementing the control logic of the application definition. Converter 58 is preferably written in a high level language that is common for engineering applications such as MATLAB, which is available from Mathworks, or MATHEMATICA, which is available from Wolfram. This program generates computer statements for the controllers that will execute the application program in a building system. If data are required for the generation of computer statements to implement an application solution then design converter 58 uses tool interface 60 or external program module interface 62 to obtain data or external program modules for inclusion in the computer statements being generated by converter 58.

Interfaces 60 and 62 are common interfaces that convert statements from converter 58 that are in a common tool interface format or a common external program interface format. Interfaces 60 and 62 may be interactive for querying a user of converter 58 for data that may be used to activate a tool or external program. For example, a set of modeling equations described in the application definition may use historical data in a data base that may be accessed through computer tool interface 60. The modeled responses may be obtained from a linear programming external module coupled to converter 58 through interface 62. Examples of computer tools that may be accessed through computer tool interface 60 include data organization tools, such as data base management systems, data filtering tools, statistical analysis packages, and analytical methods, such as linear programming models. External programs that may be accessed through external program module interface 62 may include, for example, proportional-integral-derivative control loop modules and other modular computer program components. The components coupled to the system design converter may be a web-based component 38, a Windows-based component 40, or a common component 44. Thus, infrastructure 34 enables a system engineer to define an algorithm and system structure that may be converted into an application solution for a building system. System design converter 58 uses data derived from computer tools that are accessed through computer tools interface 60 and incorporates external program modules that are obtained through external program interface 62. Consequently, the system engineer is not required to be able to program in the control language of the building system components nor does the engineer need to know how to manipulate the computer tools or to select the external program modules. Instead, the components of infrastructure 34 perform these tasks for the engineer automatically.

Figure 2A:
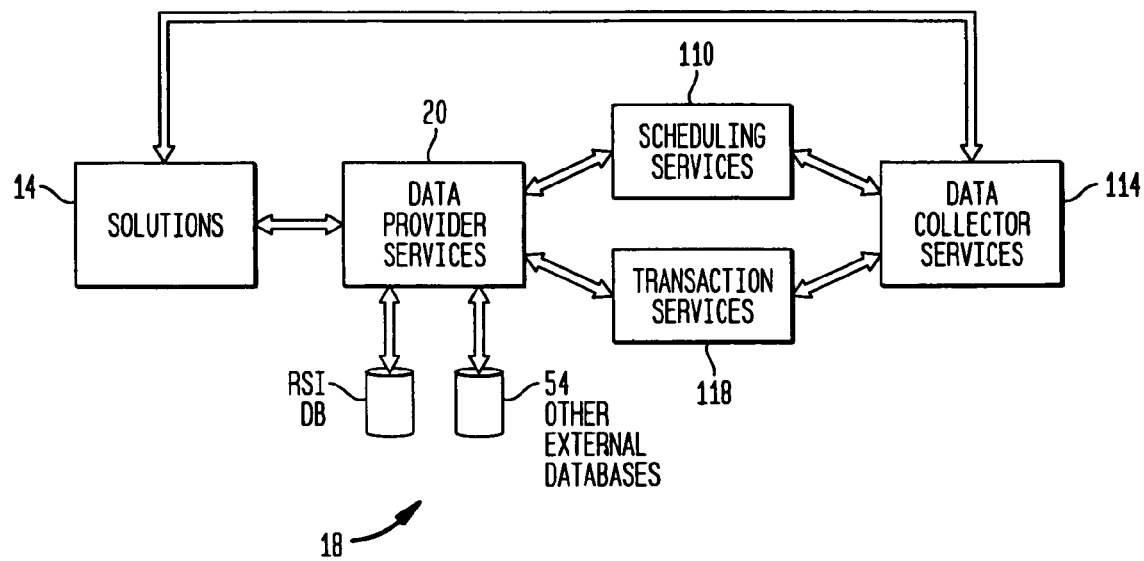
FIG. 2A is a block diagram of the components of the system shown in FIG. 1 that build and maintain the data in the database of FIG. 1.

As shown in FIG. 2A, applications 14 are coupled to database 18 through data provider services 20. Database 18 may be comprised of one or more databases. Separate databases may be used to segregate data for different sites from one another or because different data formats are better suited for various types of data. For example, a historical database or data mart 54, as it may be called, may be stored in a database with a star or snowflake configuration. This data structure facilitates data mining and the like for generating summary reports and analysis of the data within the data mart. A real-time database 52 may be maintained within database 18 for the storage of operational data from a building system coupled to database 18 through data collector services 114 as discussed in more detail below.

Database 18 may be comprised of more than one database and each database may be managed by its own database management system (DBMS). Each DBMS communicates with data provider 20, which is part of interface 60, to provide data to application 30a-30n. Data provider 20 may execute on a computer having a Pentium 4 processor operating at 1.8 GHz with 128 MB of RAM and 60 GB of hard drive storage. A DBMS for any of the database(s) of database 18 may be any known DBMS. Data provider services 20 act as a software wrapper for database 18 and provide common business logic for the applications accessing database 18. Data provider 20 receives database instructions from applications 30a-30n that conform to a common database access method instruction format and converts them into database queries that conform to the API for the particular database within database 18 that the application is attempting to access. The API responses to the queries are received by data provider services 20, converted to the common database language form, and returned to applications 14. Thus, data provider services handle the API specifics for communicating with a database within database 18. This permits the application programmer to view all of the databases as having a homogeneous structure that may be accessed by the same access methods.

Figure 2B:
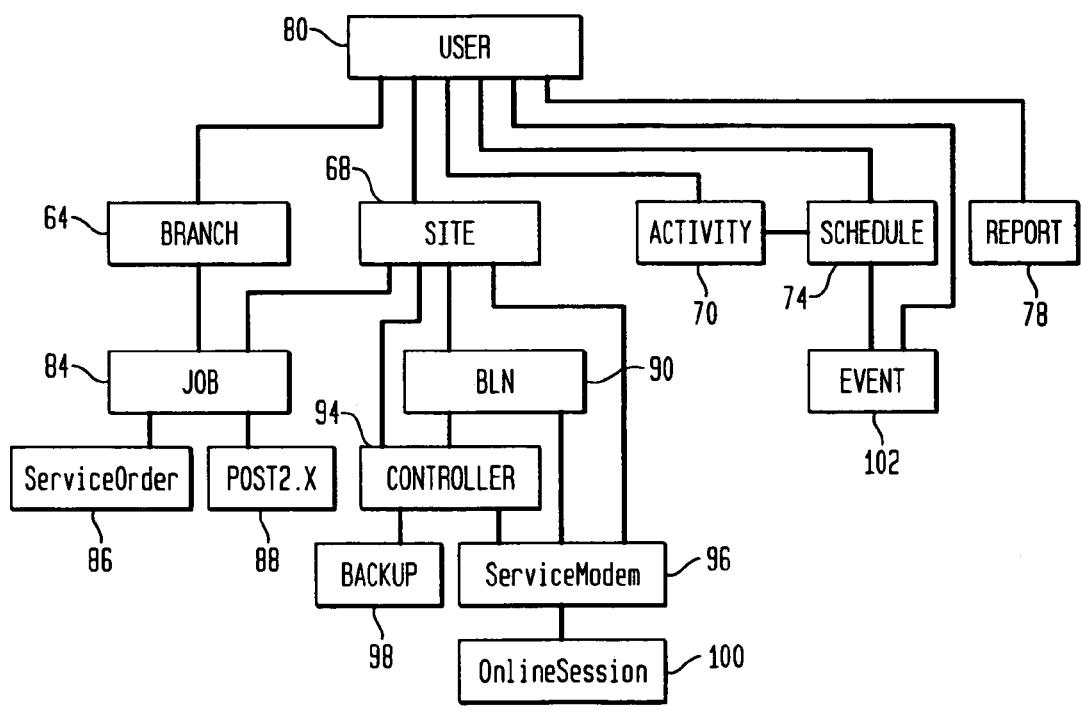
FIG. 2B is a diagram depicting an exemplary business logic structure that may be supported by a data provider of the present invention.

A business logic model that may be supported by data provider 20 is shown in FIG. 2B. The model associates a branch 64, a site 68, an activity 70, a schedule 74, and a report 78 with a user 80. User 80 includes identification for an application 30a-30n within system 10. User identification may be comprised of a logon account, domain name, and other related data. Preferably, the operating system of the computer on which data provider 20 executes may also perform application management and authentication. For example, data provider 20 may execute on a computer under control of a Windows NT 4.0 operating system so authentication of applications for access to database 18 is performed in accordance with the operational parameters of that operating system. Once authenticated, an application may access branches that are associated with the application, sites for the branch jobs associated with the authorized branches, activities associated with the sites, the schedules for performing the activities, and the reports related to the sites associated with the authorized branches for the user. Of course, this model is merely exemplary and other models may be used.

In the model shown in FIG. 2B, the parent nodes may contain references to the children nodes so that navigation to a child occurs through a parent. Each child may also contain a reference to its parent so navigation may proceed upwardly as well. Associations with a parent cause deletion of a parent node to result in the deletion of its associated children nodes. For example, deletion of a controller causes all backups associated with the controller to be deleted as well. A job is a command procedure performed in the context of a branch. A job 84 may be defined by a service order 86 or a command procedure in a particular command language 88, such as Post 2.x. Associated with a site 68 is a building level network(s) (BLN) 90. The controllers 94 and service modems 96 for a BLN 90 may be identified in the exemplary structure shown in FIG. 2B. Data for a service modem may be used to specify the information required for establishing communication with a modem. As described below, a data collector service may be activated to establish communication with a service modem so configuration data may be retrieved through the modem. The configuration data may be used to generate the controller node for a service modem during initialization of an application's portion of database 18. Generation of a service modem 96 so it may be contacted to retrieve configuration data for its parent controller is sometimes referenced herein as "discovery." Discovery may also be used after initialization to update configuration data for an associated node. By scheduling discovery for all service modems 96 associated with a particular user, system 10 may obtain up-to-date data for components within a branch. Preferably, backups 98 are stored with timestamps. Service modems 96 may also be used to troubleshoot a controller and the online session data 100 may be captured and stored in the model.

Activity 70 and schedule 74 data may be used to activate an activity at a particular time. Preferably, activity 70 includes backing up one or more field panels, restoring one or more field panels, generating a report, activating an application, or invoking discovery to obtain data for a particular BLN. This preferred list of activities is merely exemplary and other activities may be identified and stored within the model shown in FIG. 2B. Schedule data 74 identifies the activities to be activated, a time for occurrence of an activity, and the frequency of an activity, if the activity is a recurring activity. Event data 102 identifies the status of an activity. For example, it may identify a transient state, such as "active" while an activity is occurring, or a success/failure status for a performed activity. Additionally, event data 102 may identify changes within an application's data, such as deletion of a node along with the time and application identification data. Thus, event data may be used to ensure the integrity of database 18 and to provide an audit trail for database changes. To further protect data within an application's data space, some nodes may be read only. For example, user, branch, and job data may be read only data to reduce the likelihood that they are inadvertently changed. Report data 78 may be used to identify a report name, the application generating the report, a timestamp for the report, a list of activities that reference the report, as well as the content of a report.

Figure 3:
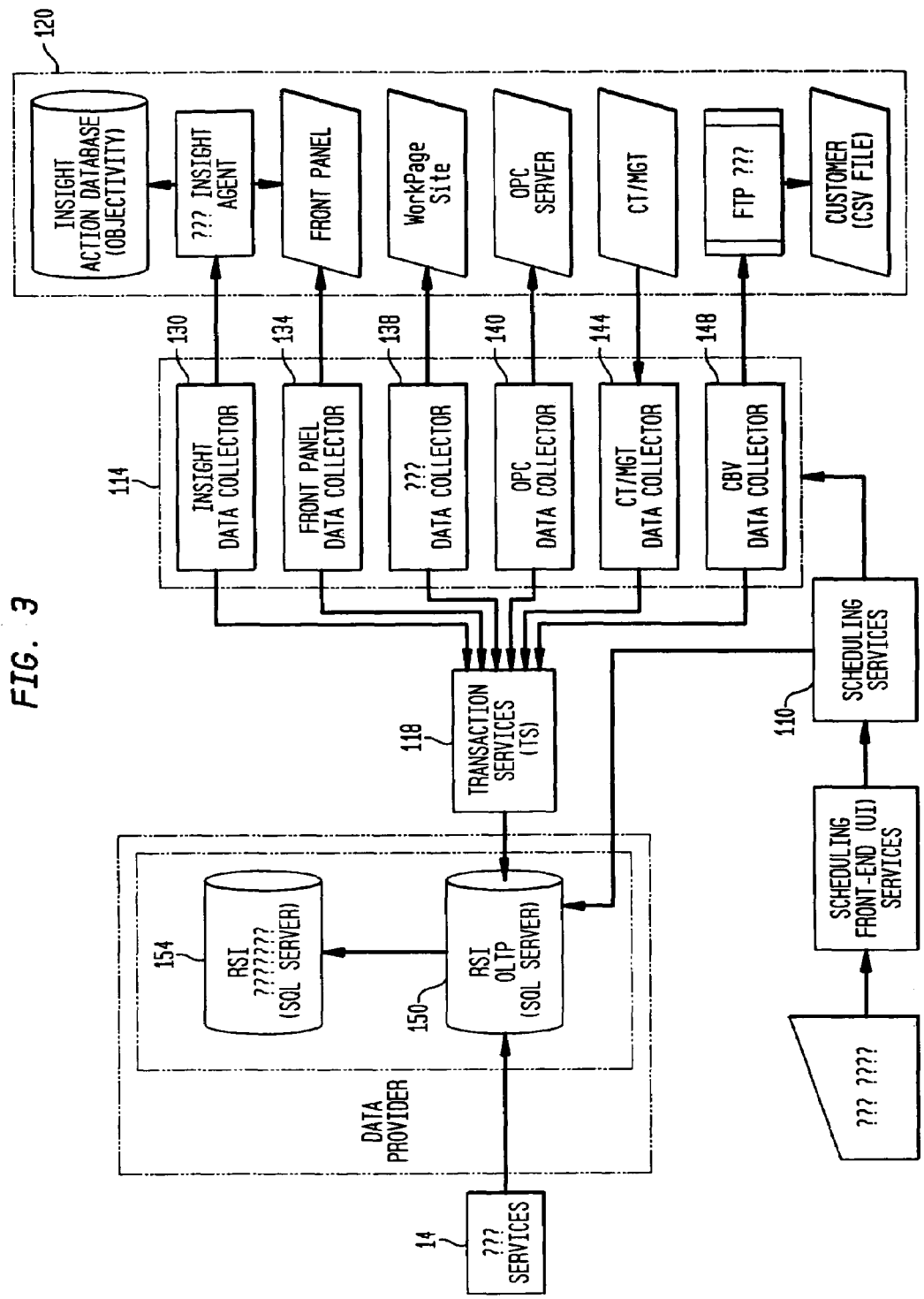
FIG. 3 is a block diagram depicting the external data sources that may be used to build and maintain the database shown in FIG. 2A.

Database 18 may also include a data mart component. A data mart is comprised of pre-constructed data for interactive use with an application 30a-30n for report and analysis purposes. These data are typically obtained from cleansing, refining, transforming, calculating, and deriving new measures from raw data stored in database 18. The segregation of data for report and analysis purposes from the real-time components of database 18 reduces the risk of performance problems arising from transaction service interaction with the real-time components of database 18. The data mart component may be constructed according to a star or snowflake configuration as this data model is more conducive to report generation or data mining applications. Preferably, data from a data collector service 114 is provided by a transaction service 118 to a SQL Server 200 Replication Service 150 which may be part of the implementation of database 18 (FIG. 3). A Data Transformation Service (DTS) that may be included as part of database 18 may be activated by Replication Service 150 to convert the received data into the appropriate format for data mart server 154. Alternatively, the DTS may be activated by scheduling service 110 in response to detection of a particular event.

With reference to FIG. 2A, scheduling services 110 execute existing schedules, detect database changes and update schedules in response to detected changes, respond to schedules as they reach their activation time, coordinate with data collector services 118, and update events in accordance with the status of a schedule. Database changes that may require schedule updating are, for example, a controller backup for a controller that is deleted from a BLN. Coordination with data collector services 118 includes rescheduling an activity that cannot be performed. For example, if no modem is available for data collector services 118 to use to communicate with a service modem, scheduling services 10 generates a data entry for performing the activity at another time. Event data generation may be distributed between scheduling services 110 and an activity. For example, scheduling services 110 may update an event to identify the time for a BLN backup but the backup activity generates the timestamps for individual controller backups and the timestamp for the end of the BLN backup event. Preferably, scheduling services 110 may activate activities as one-time occurrences or as recurring on an hourly, daily, weekly, monthly, or yearly basis. Monthly recurrence may be scheduled as a particular date and time of day each month or as a particular day of the week and time of day each month. Scheduling services 110 may be implemented using AppWorx which is available from AppWorx Corporation USA of Bellevue, Wash. or using the Windows scheduling program component of the Windows 98, XP, or NT operating systems, which are available from Microsoft Corporation of Redmond, Wash.

Transaction services 118 receive data in a common data format from data collector services 114 and provide the data to data provider 20 for populating the data structures of database 18. Each transaction service of transaction services 118 uses the common database instructions for communicating data with data provider 20, which provides the data through the API of the appropriate database component of database 18 in which the data is to be stored.

Data collector services 114, FIG. 2A, include activities that may be activated by scheduling services 110 for the purpose of providing data from an external data source 120 in a common data format to a transaction service 118 (FIG. 3). Preferably, the native format data of external data sources 120 are converted to an XML schema, although common data representation schema may be used. Transaction service 118 reads the collected data and uses it to populate the data structures of database 18. Also, an application solution(s) 30a-30n may activate a data collector service 114 to obtain data from an external data source 120 (FIG. 3). Any application 30a-30n activating a data collector service 114 to obtain data, preferably, contains logic for communicating with the activated data collector service interface and the data are delivered to the application solution and not to transaction service 118 for storage in database 18. Data collector services 114 initiate connections with external data sources through communication devices, such as modems, for example. As discussed above, scheduling services 110 or an application solution 30a-30n may be required to reschedule a request for a connection in response to no communication device being available for data collector services 114 to connect with an external data source. In response to an external data source replying that a communication device is not available, data collector services 114 may reschedule a connection attempt. For example, a busy signal from an external data source may cause a data collector service to redial the external data source modem for some number of tries before sending a message to a scheduling service or application that indicates the connection attempt failed. Data collector services 114 manage the communication devices during a data exchange with an external data source and generate the status data for events to be stored in database 18. Event data may include time of connection establishment, duration of a connection, termination of a connection, and number of connection attempts, as well as other data related to communication with external data sources.

As shown in FIG. 3, data collector services 114 may include, for example, a building control system database collector 130, a field panel data collector 134, a web data collector 138, an OPC data collector 140, commissioning/mechanical design data collector 144, and a customer service order data collector 148. Building control system database collector 130 communicates with a building control system to download update data for a local database so it may be stored in database 18. Field panel data collector 134 communicates with a field panel in a building control system to obtain data for updating data stored in database 18 associated with a particular field panel. Web data collector 138 communicates with external data sources on the World Wide Web of the Internet to obtain data for storage in database 18. For example, this data collector may obtain weather data, utility rates, equipment trend data, and the like for storage in database 18 so an application 30a-30n may forecast load requirements for a building control system. Commissioning/mechanical design data collector 144 communicates with devices associated with a building control system that contain data regarding the commissioning of equipment in a building system or the mechanical design of the system. For example, duct dimensions and geometry are mechanical design data that may be obtained by data collector 144 for storage in database 18. Customer service orders and their status data may be obtained from a customer service server by data collector 148. Preferably, these data are obtained using the File Transfer Protocol (FTP), although other communication protocols and methods may be used for the transfer of customer service data.

Figure 4:
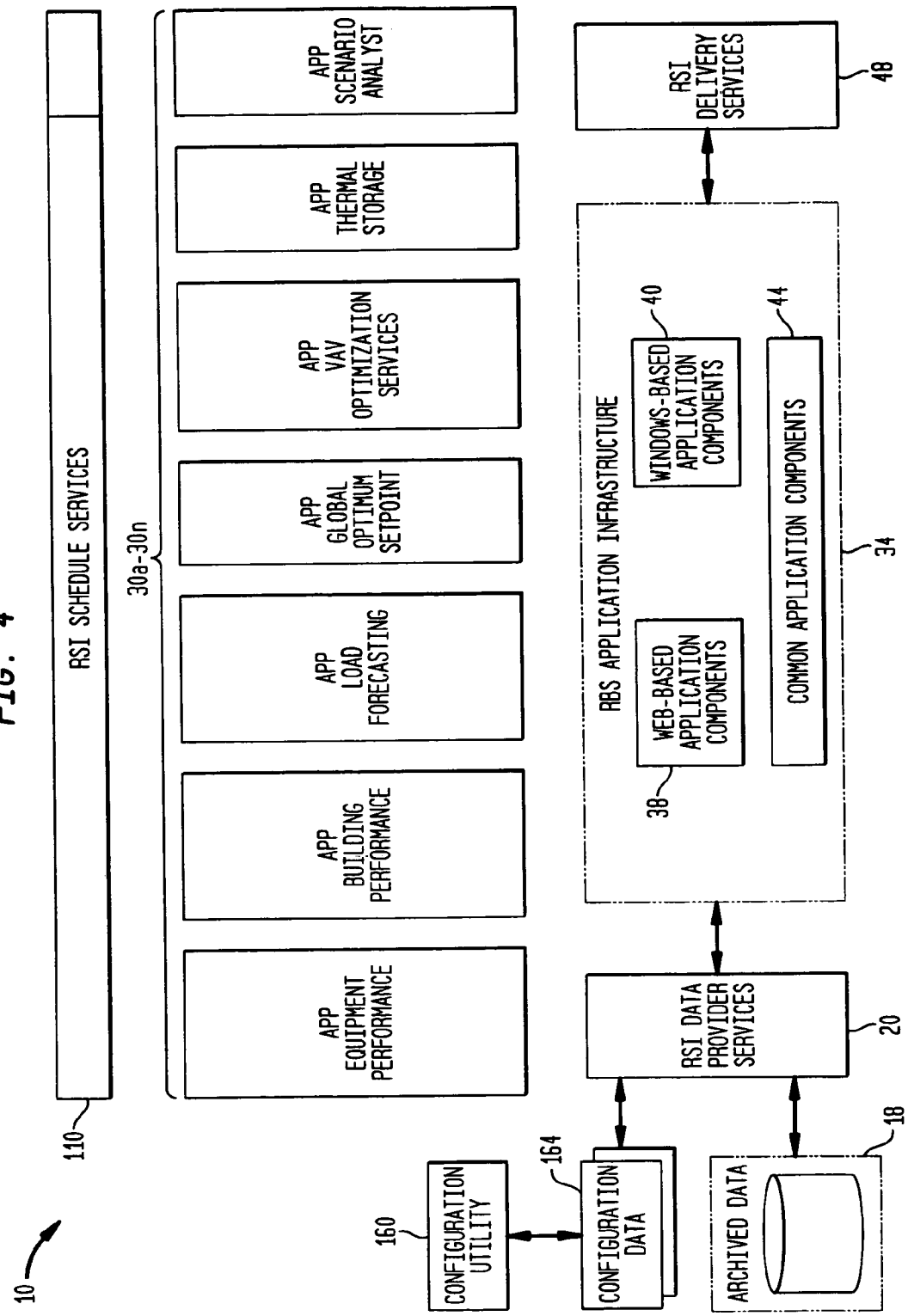
FIG. 4 is a block diagram of the relationships between applications developed with the system of the present invention and the components of the system.

Using like numerals for like components, system 10 may be depicted as shown in FIG. 4. System 10 includes applications 30a-30n, scheduling services 110, application infrastructure 34, CWP 48, data provider 20, and database 18 as discussed above. System 10 also includes a configuration utility 160 that generates a configuration data file 164. Configuration utility 160 may be used by an application 30a-30n or by an external user accessing utility 160 locally or through CWP 48 to submit configuration data that are formatted into a configuration data file 164. Configuration data include plant configuration data, equipment nameplate data, sensor point identifiers, status point identifiers, command point identifiers, equipment arrangement data, and equipment relationships. Configuration data also include system context data such as whether a sensor is at an inlet or an outlet, the material being monitored such as water, glycol, refrigerant, gas, air, or the like, and the physical units for measuring an element, such as degrees Fahrenheit, psi, or the like. Equipment typically identified for building HVAC systems are chillers, pumps, secondary chilled pumps, cooling towers, air-handling units, analog sensors, analog control points, digital sensors, and digital control points. Analog sensors typically include temperature, pressure, and flow sensors as well as kW power and kWh energy meters. Analog output points provide set point data to controllers that may be presented in floating point format. Digital sensors are typically on/off indicators, dirty filter indicators, and the like. Digital output points are typically on/off command points.

Preferably, configuration data file 164 is implemented in XML. XML is supported by a wide variety of software vendors and users may define the tags in XML that describe data content. In the present invention, generic tag names, such as site, building, plant, cooling plant, and heating plant, may be used to represent location and group contexts. Generic names, such as circuit, bank, branch, inlet, outlet, supply, discharge, return, actual, and setpoint, may be used to represent system configurations and functions. Equipment type identifiers, such as condenser, compressor, chiller, evaporator, pump, and fan, may be used to represent equipment contexts. Identifiers, such as temperature, pressure, relative humidity, flow, and air change, may be used to represent sensor types. Generic element names, such as air, water, glycol, refrigerant, power, and energy, may be used to identify media in a system. Generic attributes, such as volume and capacity, may be used to identify nameplate data and design information. As noted above, parent-child relationships in the database may be used to identify equipment group relationships.

Figure 5:
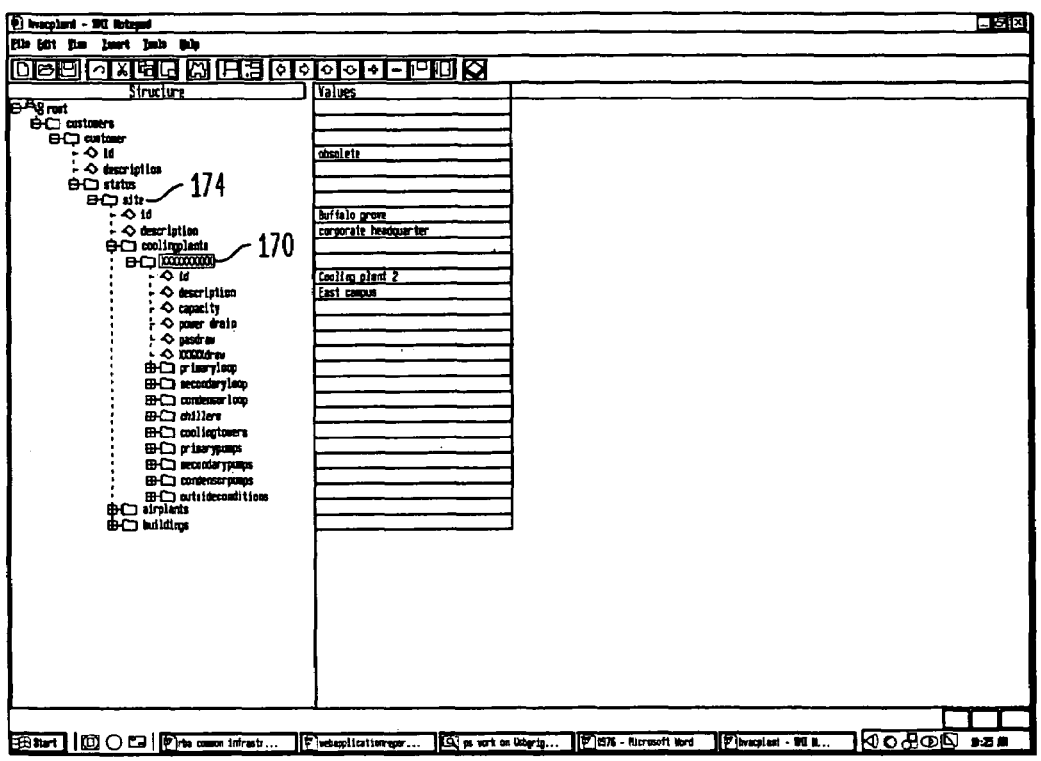
FIG. 5 depicts an exemplary XML structure that identifies a building system.

A screen of a representative system depicting the exemplary XML implementation of a configuration data file is shown in FIG. 5. As shown in the figure, structure of a file is shown on the left portion of the screen while the right side describes the data. For example, one of the cooling plants 170 is identified and described by the data associated within the file schema as "Cooling plant 2, East campus." Likewise, site 174 of the building system is identified and described by its associated data as "Buffalo grove, Corporate headquarters."

Figure 6:
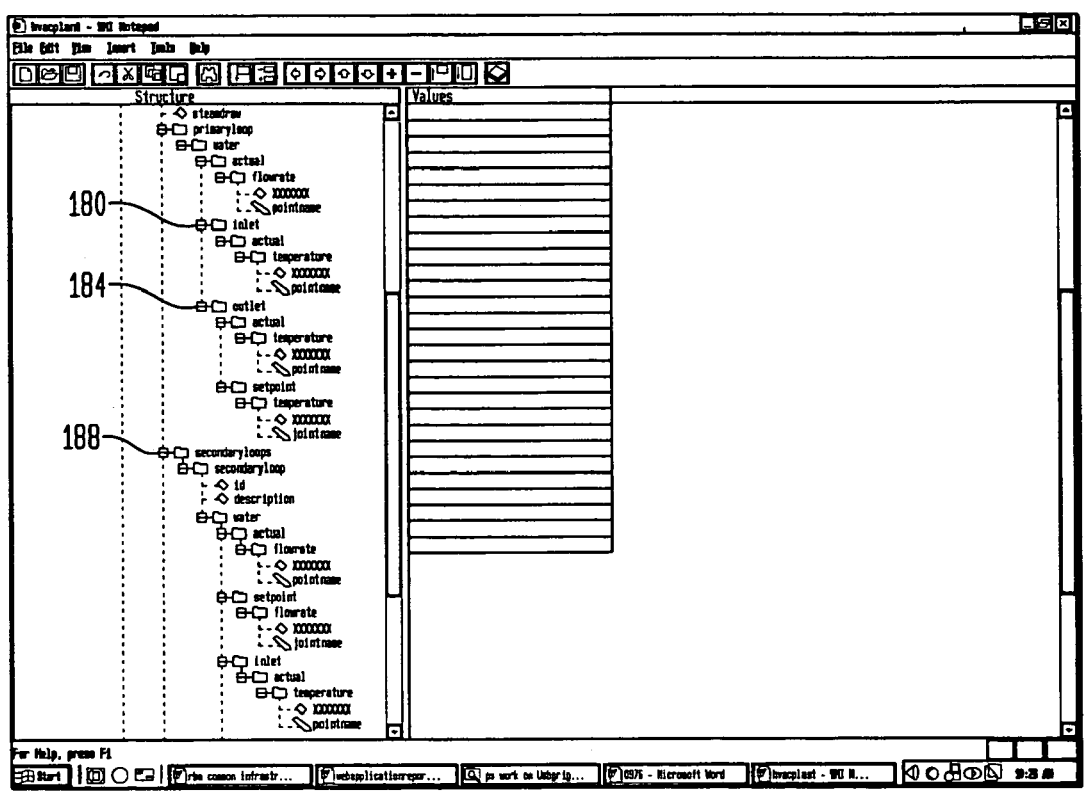
FIG. 6 depicts an exemplary XML structure that identifies loops within the building system of FIG. 5.
Figure 7:
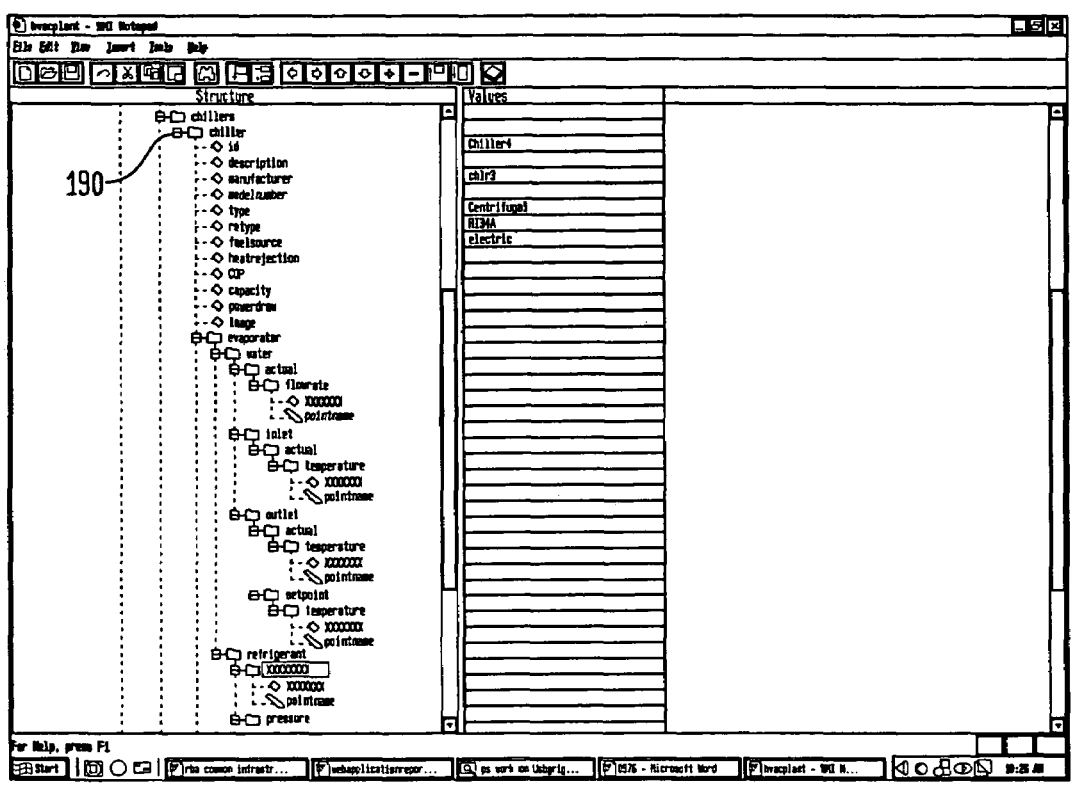
FIG. 7 depicts components within the loops of FIG. 6.

FIG. 6 depicts a primary loop that was shown as a folder in FIG. 5. In FIG. 6, the folder is opened to reveal it is a water loop and the data value fields for the name of the point and their measured engineering units may be entered by an application or other user with configuration utility 160. Inlet 180 and outlet 184, as well as secondary loop 188 and its components, are identified in a similar manner. Likewise, the chiller folder of FIG. 5 is opened in FIG. 7 to reveal specific equipment data and name for chiller 190. Although the data shown in FIGS. 5-7 may be represented in a relational database, the flexibility and expansion of the XML representation makes it the preferred implementation structure for the configuration data.

Common components 44 (FIGS. 1 and 4) provide a library of software components that may be used to execute an application 30*a*-30*n*, to use configuration data files, to retrieve data from database 18 through data provider 20, to prepare data for an application, and to execute another application. These components also operate on application definitions to identify input data needed for execution of the application, to map the identified input data to data within a configuration file, to map required points with identified system points, to retrieve data from database 18, to perform standard engineering calculations for equipment components, and to provide data to other applications. Preferably, applications and reports are developed by defining a process with application instructions that invoke common components. Other common components may include components for obtaining data from external data sources such as weather data or utility rates. When an application is invoked, the application process definition is parsed and the components executed using data retrieved from a configuration data file 164 or database 18. If the application uses web-based components, an Active Server Page (ASP) component is preferably invoked for parsing and executing the application definition. For applications invoked by local users, a Windows component is preferably invoked for parsing and executing the application definition.

Figure 8:
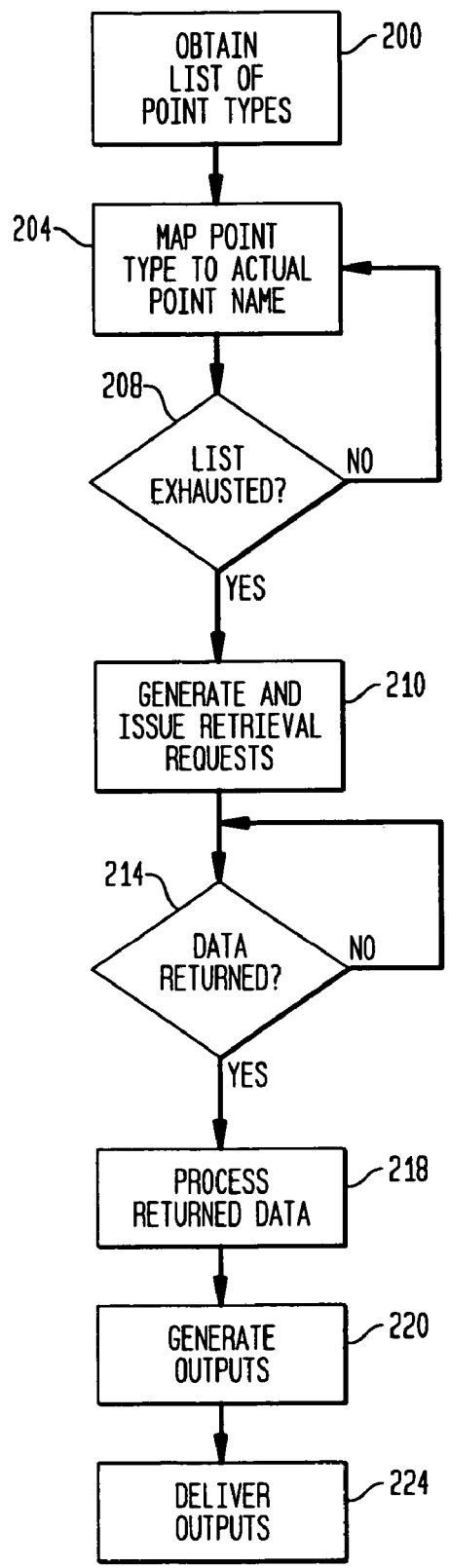
FIG. 8 is a flow chart showing an exemplary method incorporating the principles of the present invention.

An exemplary method for processing application definitions is shown in FIG. 8. An application definition is parsed to obtain a list of point types used as inputs for the application (block 200). Each point type is mapped to an actual control system point name defined in a configuration file (block 204). The mapping process is repeated until all point types and devices have been processed (block 208). Calls to data provider 20 are generated and issued (block 210) to retrieve the data required for application processing. Upon return of the requested data (block 214), the application processes the data (block 218) and generates outputs (block 220), such as reports or set point calculations, for example. The outputs may be delivered to a user (block 224) by either posting them for retrieval at CWP 48 or by storing the outputs in database 18 for later retrieval.

The structure of wrapping database 18 in a data provider 20 relieves a building system application programmer from having to program logic for database access. Likewise, manipulation of configuration data files, database access, web communication, or operating system communication, may be performed by common components within application infrastructure 34. This enables an application programmer to program logic for building system control and engineering without having to learn and provide logic for database API interaction or computer network communication. Likewise, database 18 may be updated and maintained by activities associated with building system structure that may be activated on a scheduled basis. Again, data provider 20 converts native mode data into a common format for storage in database 18 so data collector services do not have to contain database API logic. Thus, the architecture of system 10 supports the development of application solutions in an environment that does not require database and computer communication programming knowledge and that supports delivery of the applications or their outputs to external users over the Internet.

Figure 9:
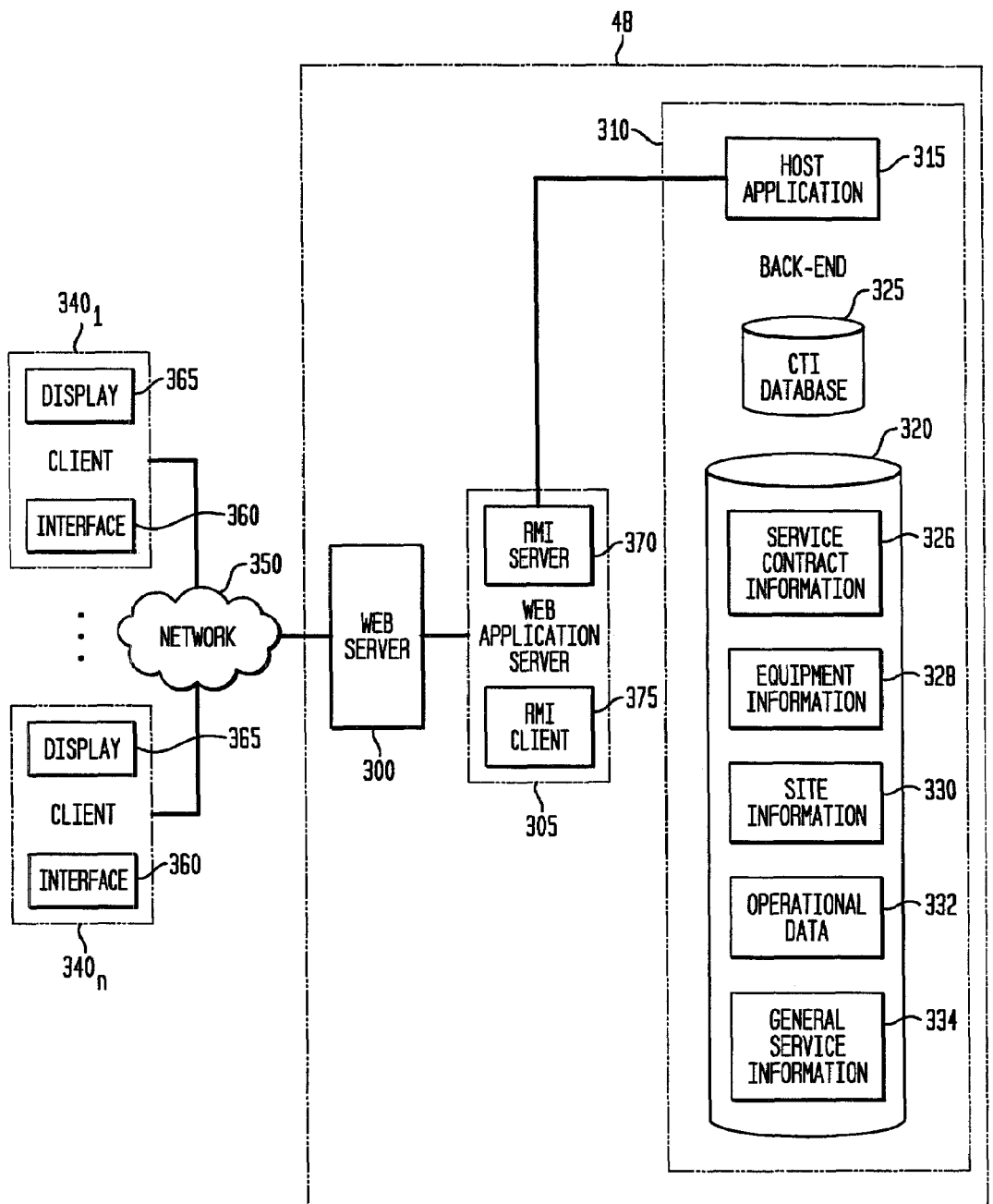
FIG. 9 is a block diagram of a system in which one embodiment of the present invention may be implemented.

Referring to FIG. 9, in order for a user to obtain service information from a client 340 the user may access CWP 48 through the network 350 In order to access the CWP 48, the user should obtain an IP address of the web site and transmit an access request to the website through the internet. The website will responds with a web page identifying the CWP 48 and requesting the entry of the user's name and password through data entry areas. The webpage may be downloaded as a HTML file which not only functions to prompt and inform the user, but also to facilitate the return of data and commands to the server. Included within the HTML file may be a set of JAVA commands or applets. Upon entering of a password, client 340 may send the message to the server, at the IP address of the website.

The system shown in FIG. 9 utilizes a web based application, which has three major components comprised of a front end, a middle tier, and a back end. The system is available and is accessed via a web site. The site accommodates a number of browsers such as Internet Explorer, Netscape Communicator and AOL browser. Network tiers can also be combinations of physical and logical tiers. The client, middleware and database systems may be physically separate computer systems (tiers). The middleware tier may be subdivided into logical tiers such as a Web server, an application server, and a transaction server tier.

FIG. 9 is a schematic diagram which provides further detail regarding key components and the flow of information between key components of the system for an embodiment of the present invention shown in FIG. 1. Referring to FIG. 9, the CWP 48 includes, for example, the web server 300 and web application server 305; back-end 310 includes, for example, a host application 315 and database server 320. The system application consists of a web application development tool, such as web application server 305, an management information (MI) database, a data feed to the host application 315 with Message Queue Interface (MQ), and a pull to a CTI database 325 from the system database 320. The web application server 305 presents Java Server Pages to clients 340-340 over network 350.

Clients 340-340 can be any general purpose microcomputer or any thin client with sufficient hardware capability for running a Web browser. Each client 340 comprises a communication interface 360 for communicating with other units within CWP 48 or other units or networks outside the CWP 48. The communication interface 360 can be implemented as a Web browser (e.g., a client software program based upon Hyper-Text-Transfer-Protocol (HTTP)). Examples of existing communication interfaces include the Netscape Navigator, JAVA Browser, Lotus Notes or Microsoft Internet Explorer. Each client will also include display 365. The network 350 includes any of a variety of network connection protocols such as Ethernet or Token Ring running software packet protocols such as TCP/IP that support HTTP transmissions.

MQ client and process to forward data to the host application 315 reside on the application server 305. The database 320 contains the system database. Other databases may reside within database 320. Information stored in database 320 includes service contract information 326, equipment information 328, site information 330, operational data 332 and general service information 334. Remote Method Invocation (RMI) is a model of distributed object application and has a RMI server 370 and RMI client 375. A typical server application creates some remote objects, makes references to them accessible, and waits for clients to invoke methods on these remote objects. A typical client application gets a remote reference to one or more remote objects in the server and then invokes methods on them. RMI provides the mechanism by which the server and the client communicate and pass information back and forth.

In much of the existing middleware, objects used are highly interdependent and defined by the function(s) of the middleware. Some well-known middleware objects include: Sun Microsystem's Java Server PageTM ("JSP") and Enterprise Java BeanTM ("EJB"). The JSP object executes programs, based on requests from one or more clients. The EJB object executes certain programs that are pre-packaged into an "Enterprise Java Bean" format. Other objects may include, for example, general data files, general programs, and general multimedia content files (e.g., text, video, sound, and voice content).

In the application for an embodiment of the present invention, once a user input is received from a client, the information is passed as a string object through the RMI server 370 in the web application server 305. The RMI server 370 then activates a C Dynamic Link Library (DLL) through Java Native Interface (JNI). The message is then passed to the MQSeries queue. The host application 315 picks up the application message from the queue and formats the user information in a CSR screen for quick and accurate service. This web server-to-mainframe host application message exchange makes use of a three tier distributed model. This not only makes the message exchange scalable and secure, it can also be reused in other similar application message exchanges with little or no modifications. The RMI server 370 uses a Java security policy file to limit the RMI server's access on the server.

It is important to point out that the precise operating systems and hardware configurations of clients 340-340, network 350 and CWP 48 are not limited to any specific hardware or software configuration. These systems can be implemented on a wide variety of hardware and software platforms that are well known in the art and are within the true spirit of the present invention.

Referring now to FIGS. 10-25, the customer web portal of the present invention is depicted through a series of screen shots of web page templates. Those skilled in the art appreciate, however, that embodiments of the present invention may vary substantially or insubstantially in the features and functions provided by such systems without departing from, modifying, adding, or deleting to the scope of the present invention as described herein and expressed in the claims.

Figure 10:
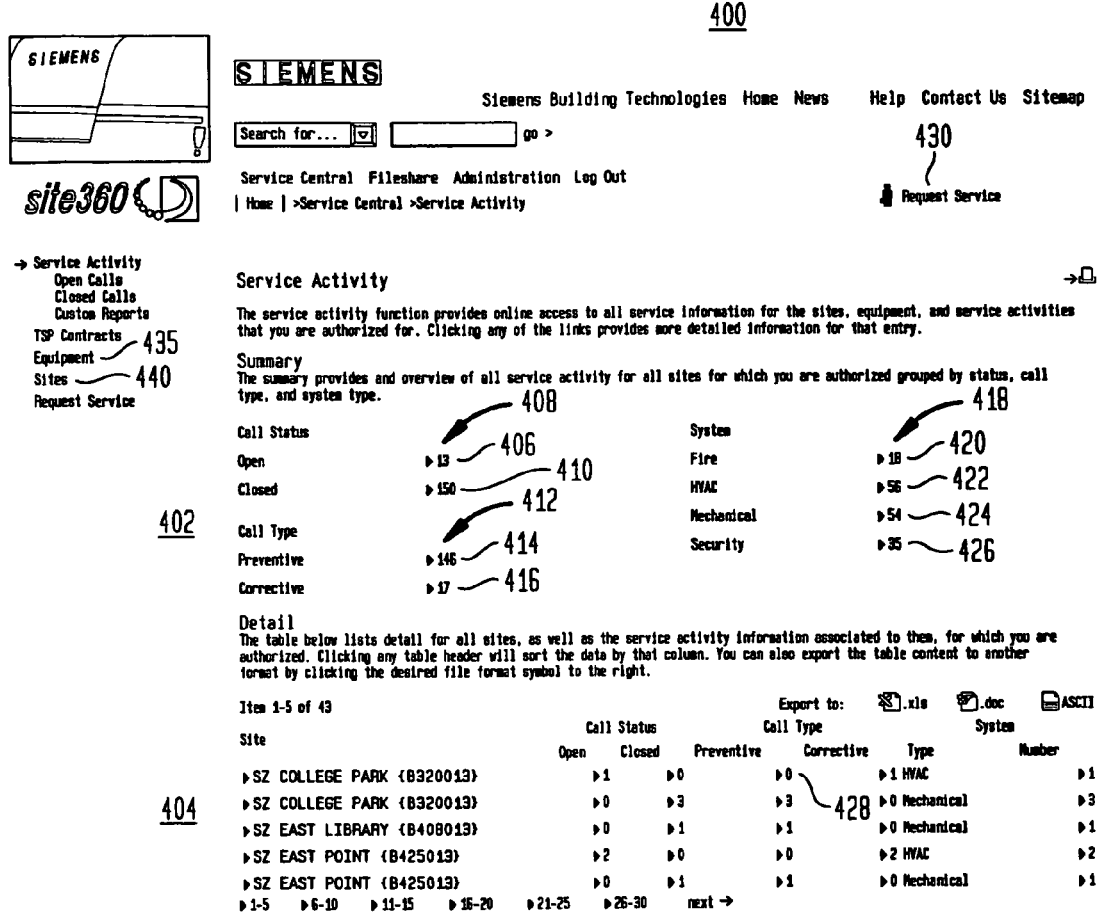

As shown in FIG. 10, the customer web portal 48 facilitates the overview for a user of service activity and contracts. More specifically, the CWP 48 is initially accessed by inputting the appropriate uniform resource locator on a web browser connected to the Internet. As shown, upon accessing the CWP 48, a main menu page 400 is displayed. This page 400 provides access by a user to the features and functions of the present invention. However, as discussed above, it is to be appreciated that this embodiment, and various other embodiments of the present invention, may be accessible via any network and system including, but not limited to, the Internet, intranet, private network, local area networks, wide area networks, distributed networks, and public networks. The main menu page 400 provides links (via tabs, buttons, and hyperlinks) to various other screens, which are provided on various web pages. The CWP 48 provides security and control features by utilizing a login name and password to control access. The pages displayed by the CWP 48 generally include further links allowing users many options for obtaining service related information.

As shown in FIG. 10, the main menu page, in a preferred embodiment, is provided with display area 402 for service activity and display area 404 which in a preferred embodiment is a table listing details for all sites the user has access to as well as service activities associated to the site. In alternative embodiments, other types of information such as service contract information may be displayed. The service activity section 402 displays the status of all service activities for the customer's facilities regardless of the method by which the service order was placed, whether by phone, email or other means. Display area 402 is divided into several areas allowing a user to obtain service activity information in a variety of fashions. The status of each service request is updated continuously so information is always timely. Accordingly, the user can check the status of a service request at any time. Display area 406 allows a user to display service activity by call status. That is, to display information about open and closed service requests. A user may request information about open service requests by clicking on link 408. In the alternative, the user may request information about closed service requests by clicking on link 410.

Figure 11:
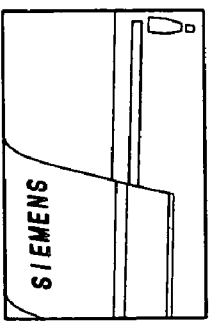

By selecting link 408, the user can display an overview of all service activities with an "open status," as shown in the display 500 shown in FIG. 11. A similar display would appear if the user selected link 410. Open status activities include, but are not limited to, open, scheduled and dispatched calls. The information displayed for open calls includes the date the service was requested, the service order number, the status of the call, the site where the service is to be performed, the description of the service to be provided, the call type, such as preventative or corrective, the system type, and the purchase order number.

Figure 12:
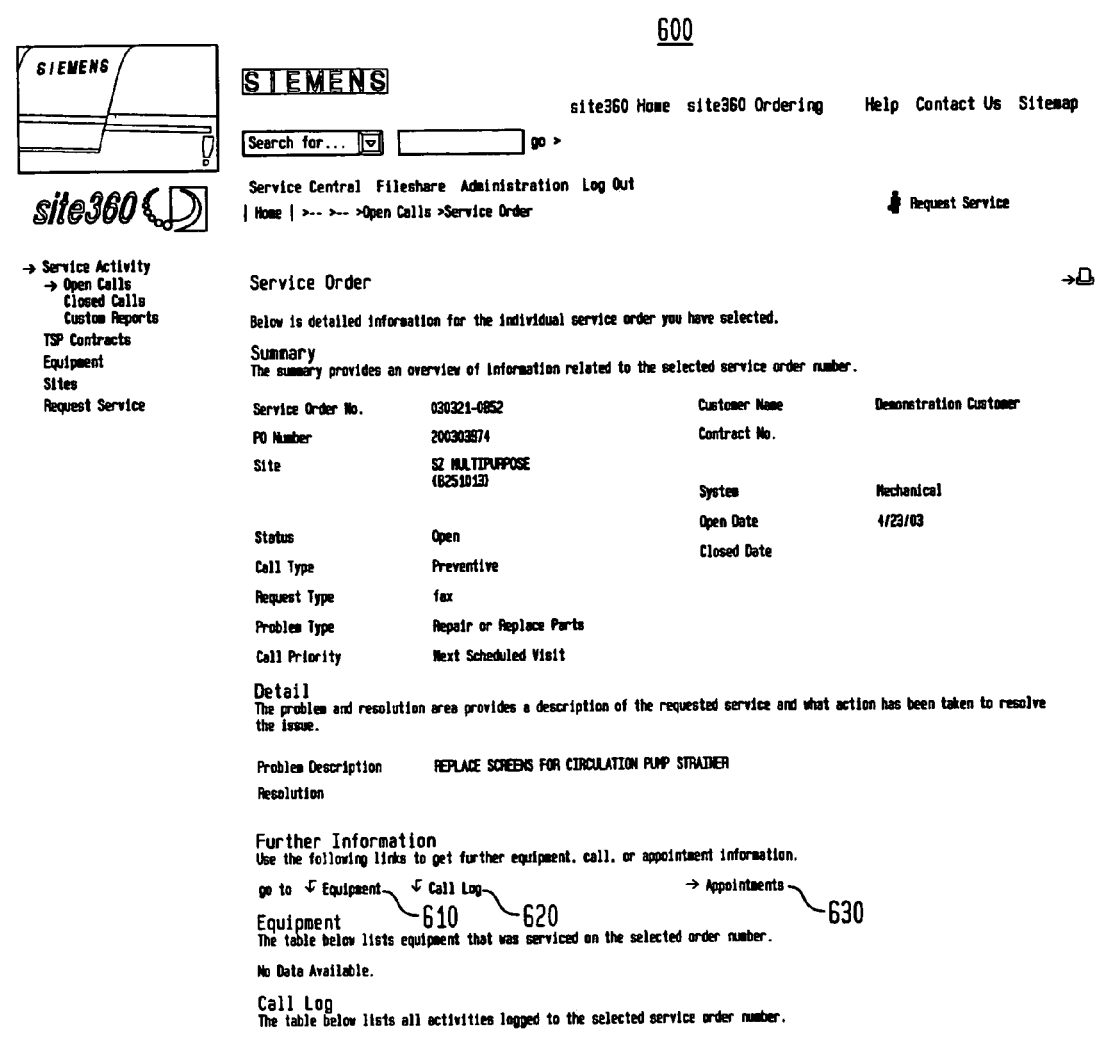

By clinking on an order number link, such as order number link 510, the display 600 shown in FIG. 12 is displayed. Display 600 provides information about an individual service order. Information displayed includes the service order number, the purchase order number, the site where the service is to be done, the call type, how the request was made, the problem type, the call priority, the customer name, the contract number, the type of system, the open date and if applicable, the close date. Further provided is a problem and resolution area which provides a description of the requested service and what action has been taken to resolve the issue. The screen shot shown in FIG. 12 may also be provided with a list of equipment that was serviced on the selected order number and all the activities logged to the selected service order number.

Links 610, 620 and 630 are provided allowing a user to obtain further information and the equipment being serviced, the call log, and appointments. When the equipment link 610 is selected, either a description of the equipment may be provided, or a graphic of the equipment may be provided. In one embodiment, the graphic of the equipment may be illustrated in such a way as to highlight which aspect of the equipment requires service.

If appointment link 630 is selected, the display 700 shown in FIG. 13 is displayed. The display 700 shows the user information about the their service appointment, including the service order number, the purchase order number, the site where the service is to take place, the appointment number, the open date, the appointment status, the contract number, the customer name, the branch of the service provider performing the service, and information about the individual performing the service. Information may also be provided about the equipment that service was provided on for the particular appointment.

Referring again to FIG. 10, if user selects link 410, the screen shot shown in FIG. 14. is displayed. The display 800 shown in FIG. 14 provides the same types of functions as the web page shown in FIG. 11, except that the information displayed is about closed calls and not open calls. The information about the closed status activities include, but are not limited to, open, scheduled and dispatched calls. The information displayed for open calls includes the date the service was requested, the service order number, the status of the call, the site where the service is to be performed, the description of the service to be provided, the call type, such as preventative or corrective, the system type, the purchase order number, and information about whether the service provided has been paid for. By selecting an order number link 810, a screen shot similar to that shown in FIG. 12 is displayed.

Referring again to FIG. 10, display area 412 allows a user to display service information whether a call type is preventative or corrective. By clicking on links 414 or 416 the user will be presented with a display similar to FIG. 11, with the user being presented having an overview of all service activities with a preventative or corrective status.

Display area 418 allows a user to display service information based upon system types such as fire, HVAC, mechanical and security. By selecting links 420, 422, 424 or 426 a user may display an overview of all service activities by system type. By selecting a link 420, 422, 424 or 426 a display similar to that shown in FIG. 11 will be displayed.

Figure 15:
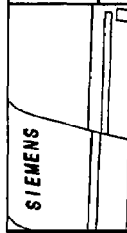

As discussed above, display area 404 allows a user to display service information about one or more sites. For each site, information can be displayed by call status (open or closed), call type (preventative or corrective) and system (Fire, HVAC, Mechanical or Security). For example, links may be provided to allow users to access call status information, call type information and system information for an individual site. When a user clicks on preventative link 428, the display 900 shown in FIG. 15 is displayed. The information displayed includes the open date of the service, the order number for the service, the status of the service, the site where the service is to take place, the description of the service to be provided, the call type, the type of system to be serviced, and the purchase order number.

As shown in FIG. 10, the main menu page 400 provides an "Request Service" link 430 by which a user may request service using the CWP 430. Upon a user selecting the "Request Service" link, a new page in the CWP is accessed that requests detail about the service to be requested. Display 1000 in FIG. 16 displays data fields allowing a user to enter data about the service request in the appropriate data fields. The data entered includes request for type, including request for service and request for service quote, site, equipment, location, description of service needed, contract no., information about the party requesting service and other information.

Figure 17:
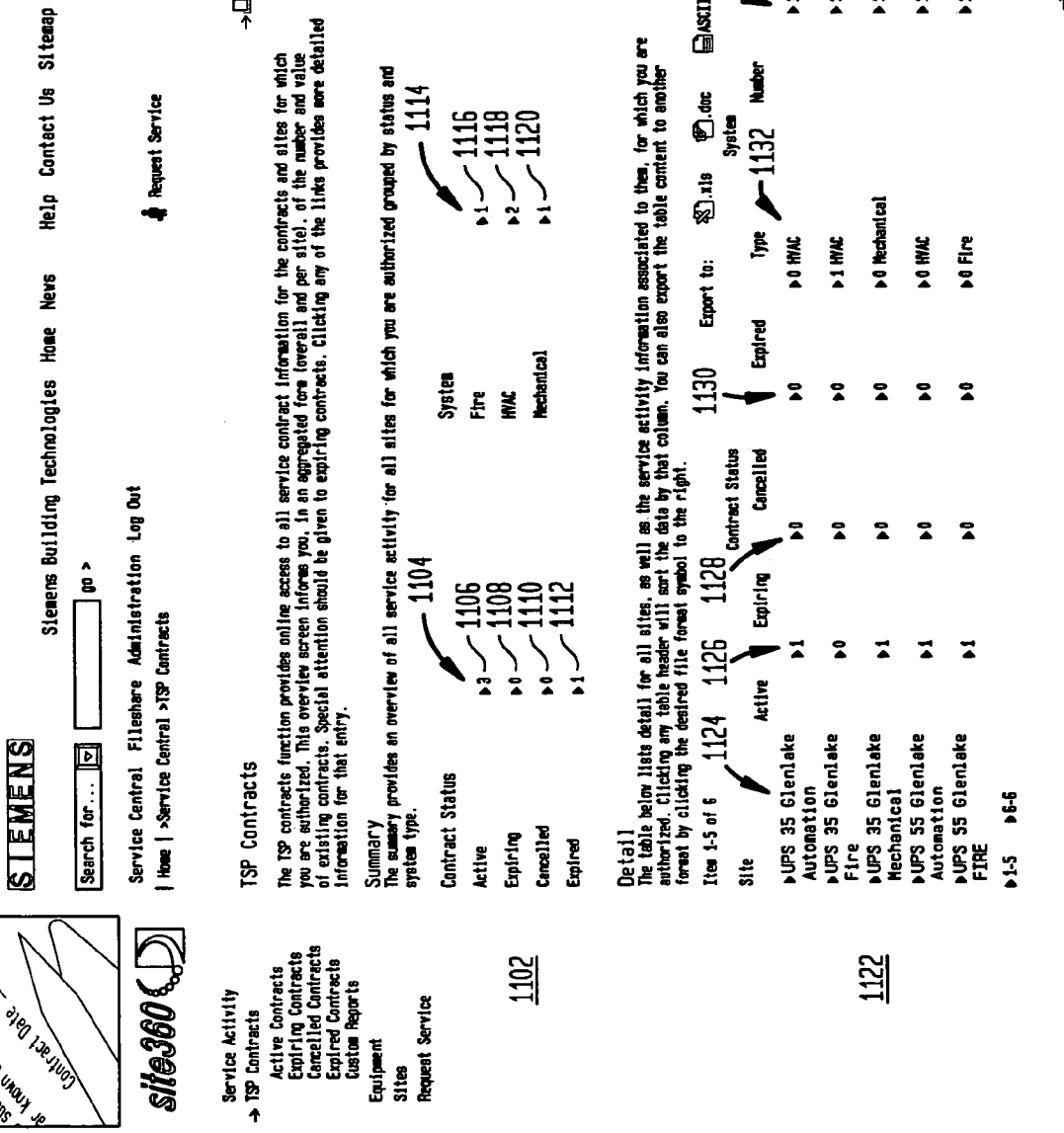
Figure 18:
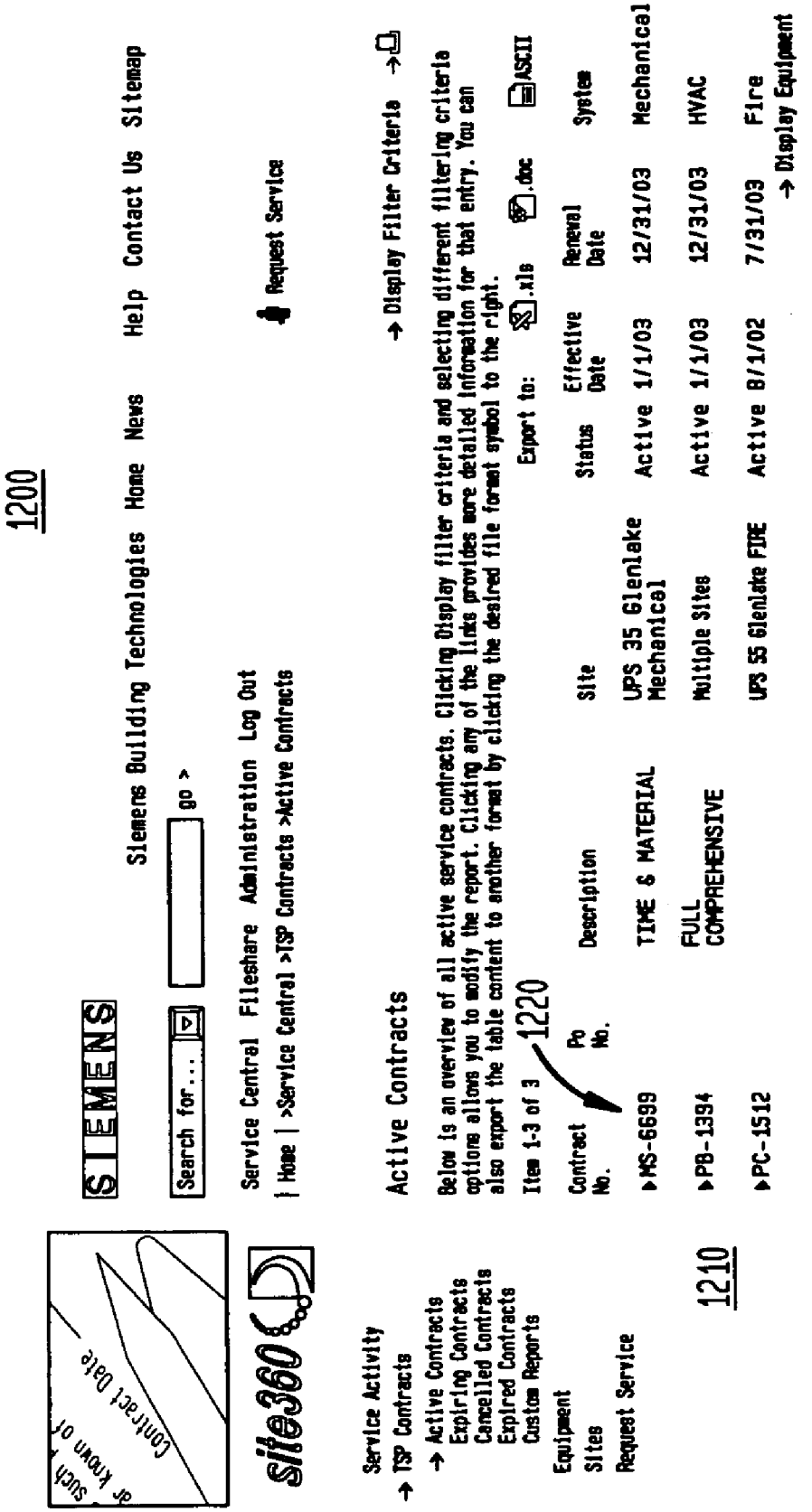

Referring now to FIG. 17, the CWP 48 provides online access to all service contract information for the contracts and sites for which the user is authorized. As shown in display 1100 of FIG. 17, a summary section 1102 is provided that provides a overview of all service activity for all sites for which the user is authorized grouped by status and system type. In display area 1104, a user is provided with the option of viewing contracts by status. A user may view information on active contracts by selecting link 1106, on expiring contracts by selecting link 1108, cancelled contracts by selecting link 1112 and expired contracts by selecting link 1112. For example, if a user selects link 1112 to view active contracts, the display 1200 shown in FIG. 18 is provided to the user. FIG. 18 provides a display area 1210 which displays for the user a table listing all of the users active contracts. Information displayed to the user includes, but is not limited to, the contract number, the purchase order number, a description of what the contract was for, the site where the contract was for, the status of the contract, the effective date of the contract, the renewal date of the contract and the type of system the contract pertained to. The user may obtain further information about the contract by clicking on link 1220.

Figure 19:

By selecting link 1220, the display 1300 shown in FIG. 19 is displayed. This display 1300 will provided the user with complete details for a selected contract including, but limited to, sites and equipment covered under the contract, contract duration and service history under the specified contract. In display area 1310 of FIG. 19, a user may be provided with information such as contract number, status information, effective date of the contract, renewal date of the contract, time to renewal of the contract, the technician assigned to the contract, the branch of the service provided providing the service, a secondary contact, the coverage type of the agreement, and the type of system the agreement pertains to. In display area 1320, a user may use link 1330 to obtain service history information or link 1340 to obtain scheduled services information. In display area 1350, a table listing sites and equipment covered under the service contract is displayed. A user may select link 1360 to obtain further information about the site which the contract pertains to. The user further has the option to select link 1370 to obtain information about the equipment the contract pertains to.

Referring again to FIG. 17, display area 1114 displays for the user an overview of contracts categorized by system. As shown in FIG. 17, for example, links 1116, 1118 and 1120 allow a user to obtain contract information by system categories Fire, HVAC and Mechanical. Clicking on any of links 1116-1120 will allow a user to generate a display similar to that shown in FIG. 18 allowing a user to view lists of contracts about different types of systems.

As shown in FIG. 17, display area 1122 may include a table listing details for sites, as well as the service activity information associated to them, for which the user is authorized. The table may include information such as site, contract status (whether active, expiring, cancelled or expired), type of system, and number of contracts. Separate links such as links 1124-1134 may be provided to allow a user to obtain further information about a site or a type of contract at a site.

The present invention also allows users to obtain service and contract information about equipment. By selecting link 435, in FIG. 10, the resulting screen shot shown in FIG. 20 is provided. The equipment function provides the user with complete service and technical information for their equipment. Using dropdown box 1402, a user may select a site. A table of all equipment for that site appears, as shown in display area 1404. The table preferably includes information such as site, equipment or services, quantity, location within the site, asset id and type of system. A user may obtain further information about a particular piece of equipment at a site by clicking on the link that represents the equipment, such as link 1406. The resulting display is shown in FIG. 21.

Figure 21:

As shown in display 1500 of FIG. 21, all relevant technical information and detail for a selected piece of equipment is provided. This information may be displayed in display area 1510 for example. Information displayed in display area 1510 may include site information about where the equipment piece is located, equipment quantity, equipment location, by system or physical location, asset id, warranty expiration, contract number and system. Link 1520 is provided to allow the user to obtain contract information about the equipment. By clicking on link 1520, the display 1600 shown in FIG. 22 is displayed.

As shown in FIG. 22, the display area 1610 provides complete detail for a selected contract. For example, which sites and equipment are covered, contract duration, and service history under the specified contract. Further information may include status, effective date, renewal date, time to renewal, technician assigned to perform maintenance, purchase order no., branch responsible for maintenance, contact person, coverage type and system. In display area 1620, the user is provided with link 1630 for service history to get the service history for the contract, and link 1640 for the scheduled service information for the contract. In display area 1650, the user may be provided with a link allowing the user to display the entire service contract. In display area 1660, a display such as a table may be provided to list sites and equipment covered under the service contract. The user may select a link such as link 1670 to display the equipment covered by the contract for the selected site. The equipment covered by the contract for the selected site may then be displayed at the right hand side of the table.

Referring again to FIG. 21, display area 1530 provides the user with an overview of service activity for the equipment. In a preferred embodiment, an overview is provided of all service activities with an open status for a piece of equipment, including open scheduled and dispatched calls. This information may include the date the service request was opened, a description of the service, the call type of the service, the service order number and the purchase order number. Links may be provided to provide users with further information. For example, link 1540 may be provided to allow a user to obtain further information about an service request order for a piece of equipment. As further shown in FIG. 21, display area 1550 provides an overview of all service activities with a "closed" status, including completed, closed and paid calls) for a piece of equipment. This information may include the date the service request was opened, a description of the service, the call type of the service, the service order number; and the purchase order number. As with display area 1530, links may be provided to provide users with further information. Link 1560 is similar to link 1540 in that it allows a user to obtain further information about a service order associated with a piece of equipment. If a user selects either link 1540 or 1560, the display 1700 shown in FIG. 23 is displayed.

As shown in FIG. 23, display area 1710 provides an summary overview of information related to the selected service order number. This information may include the service order number, the purchase order number, the site where the service is to take place, the status of the service order, the call type, the request type, the problem type, the call priority, the customer name, the contract number, the type of system, the date when the service order was opened, and the date when the service order was closed. By clicking on link 1720, the user is provided with information about the contract related to the service order in a display similar to FIG. 19.

Still referring to FIG. 23, display area 1730 provides a problem and resolution area for providing a description of the requested service and what action has been taken to resolve the issue. Display area 1740 provides still further information about the service order. A user may select link 1750 to get further equipment information relevant to the service order. The user may select link 1760 to get a display of the call log associated with the service order. The user may also select link 1770 to get appointment information associated with the service order.

Referring again to FIG. 23, display area 1780 may include a table for listing equipment that was serviced on the selected order number. Information about the equipment may include the name of the equipment, the quantity of equipment, the location of the equipment, and the asset ID of the equipment. Display area 1790 may also be included to provide a list of all activities logged to the selected service order number.

Figure 24:
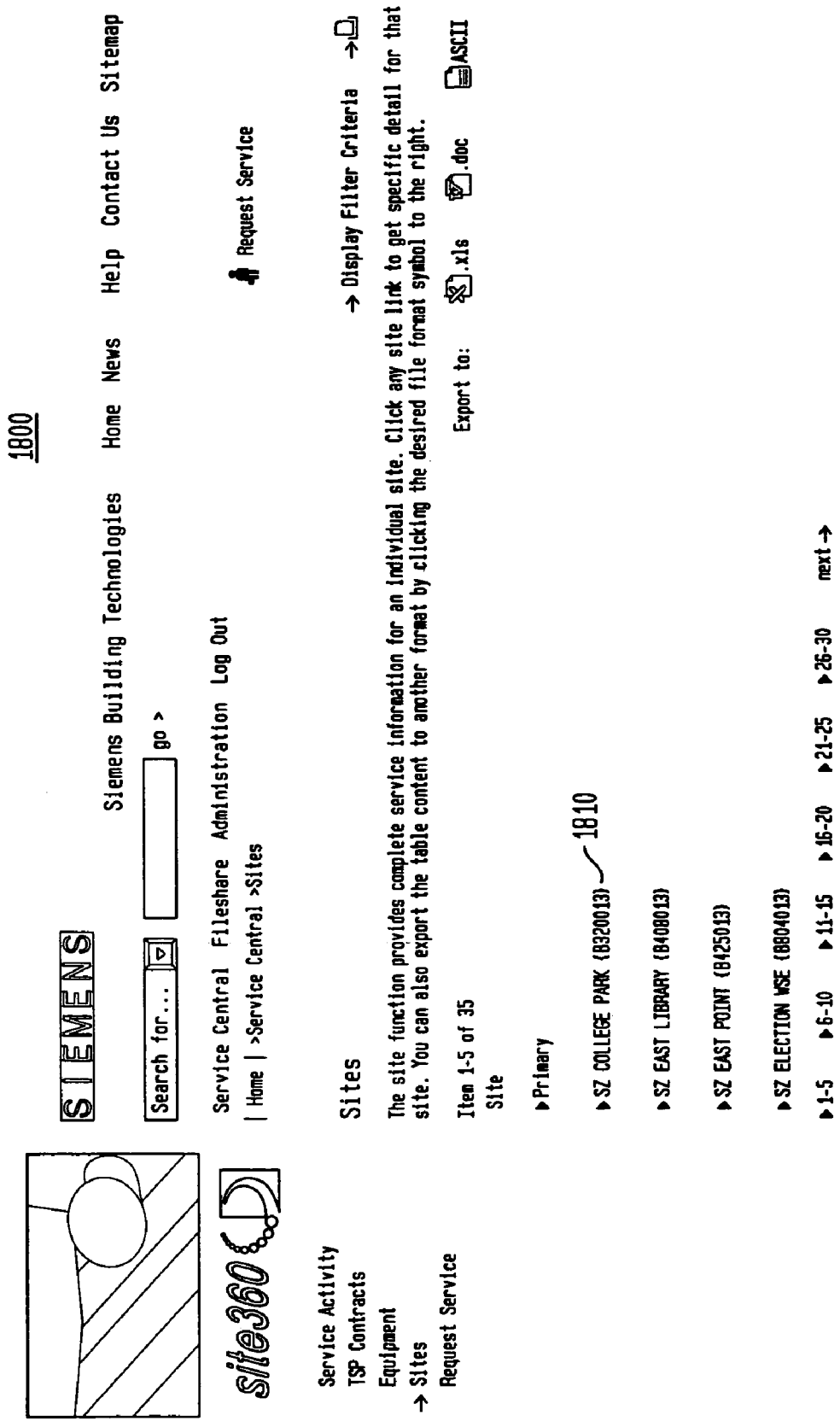

Referring back to FIG. 10, a user may select link 440 to get service activity information by site. If a user selects link 440, the display 1800 shown in FIG. 24 is presented. FIG. 24 provides the user with service information for an individual site. A user may click on any site link, such as link 1810, to get specific detail for that site. The user may also export the table content to another format by clicking the desired file format symbol shown in FIG. 24.

By clicking on link 1810 for example, the display 1900 in FIG. 25 is displayed. FIG. 25 provides detailed data for a single selected site, enabling the user to supervise and track all service activity for that site. Display area 1910 of FIG. 25 provides an overview of all service activity for a site grouped by status in display area 1920, by call status in display area 1930, and by system in display area 1940. Display area 1920 is comprised for example of links 1950 and 1960, which provide the user with information about open and closed service requests for an individual site in a similar fashion to a user selecting links 408 and 410 in FIG. 10. Display area 1930 may be comprised of links 1965 and 1970, which provide the user with information about preventative and corrective service requests for an individual site in a similar fashion to a user selecting links 414 and 416 in FIG. 10. Display area 1940 may be comprised of one or more links, such as links 1975 and 1980, which provide the user information about HVAC or mechanical systems for an individual site in a similar fashion to a user selecting links 422 and 424 in FIG. 15.

Referring still to FIG. 25, service activity detail may be displayed for an individual site in display area 1985. Display area 1985 may include a table which lists detail for an individual site, as well as the service activity information associated with it. Clicking on a table header will sort the data by that column. The user can also export the table content to another format by clicking the desired file format symbol to the right. Display area k may include information such as order number, purchase order number, description of the service activity, the call status, the call type, the date when the service request was opened, and the type of system that requires service. By clicking on link 1990 for example, the user can get further information about a service order in a display similar to that shown in FIG. 12.

Figure 26:
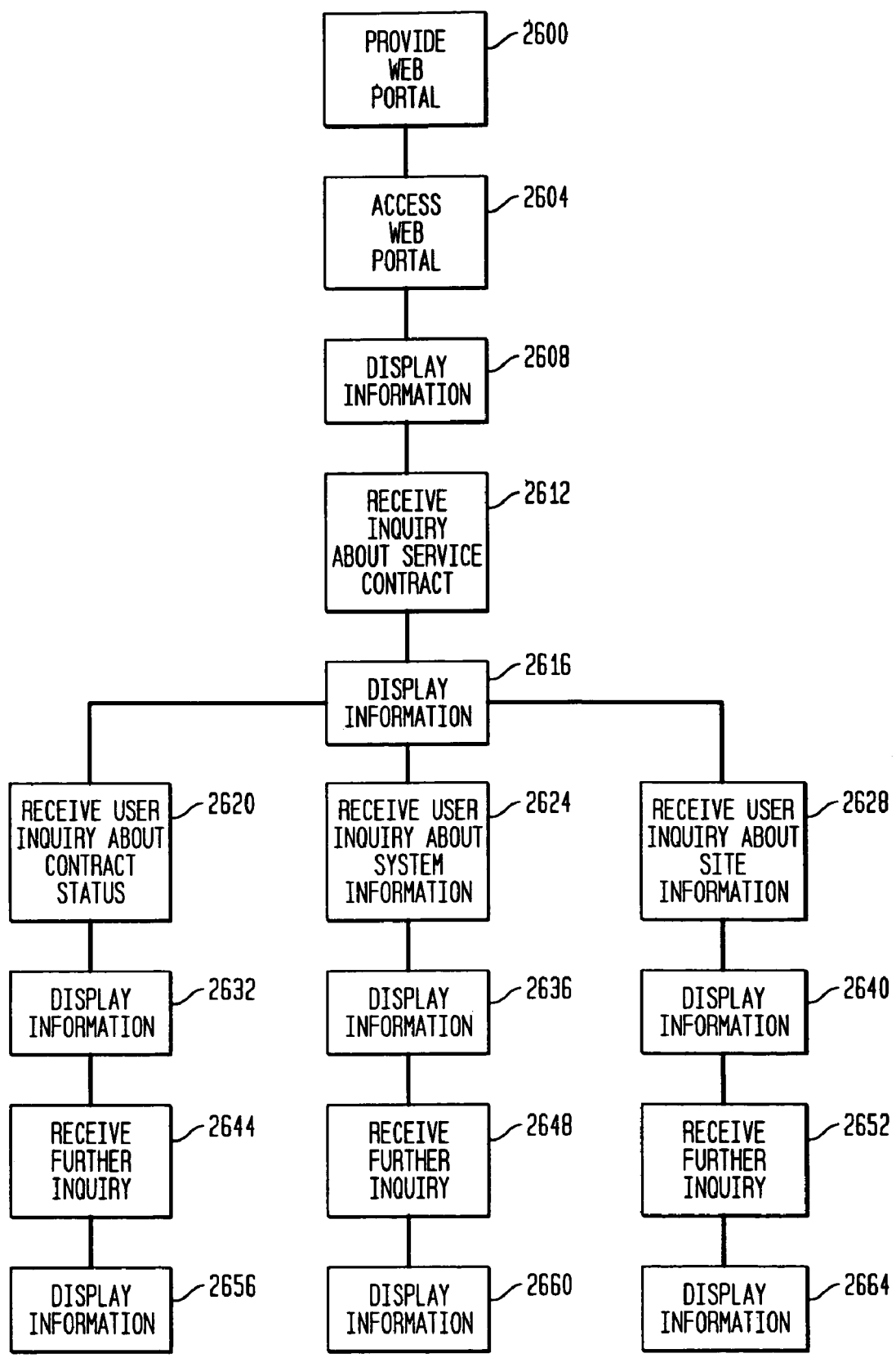

FIG. 26 provides an exemplary overview of a preferred embodiment of the present invention. As shown, the process of the present invention generally provides a customer web portal comprising a database for storing service contract information about a plurality of building sites, though it is understood that some users of the present invention may only have one building site for which service contract information is stored in the database (block 2600). This web portal may be accessed by a client computer using the correct url to reach the customer web portal over a network (block 2604). Once a user has accessed the web portal, general service information about the user's one or more building sites may be provided to the client and displayed on the client's display (block 2608). The user may then opt to request information about service contract information, and may make a request using the client to obtain information from the database in the customer web portal to display the information on the client display (block 2612). The information may then be provided to the client and displayed on a client display after the request is received by the customer web portal (block 2616).

The user may then have several options for receiving more detailed information about the user's service contracts for one or more building site (blocks 2620, 2624 and 2628). One option the user has is to make an inquiry to the web portal, using a client, about the status of a service contract, to determine if the service contract has expired, is expiring, cancelled or active (block 2620). The resulting information is then provided to a client and displayed on a client display (block 2632).

Another option the user has is to make an inquiry to the web portal, using a client, about system information (block 2624). For example, a user may wish to obtain service contract information about its HVAC systems, mechanical systems, fire safety systems and other types of systems used in a building site. The information is then retrieved from the customer web portal, and displayed on a client display (2636).

Still another option a user has to obtain more detailed information about one or more building sites pertaining to one or more service contracts (block 2628). The resulting information may be received by a client and displayed on a client display (block 2640). Using the present invention, the user has an unlimited number of options for options for obtaining service contract information for one or more building sites. Using the present invention, the user has an unlimited number of ways in which to obtain service contract information, which may include service order information, information about equipment being services including, but not limited to, technical diagrams, and one or more building sites covered under one or more service contracts (blocks 2644, 2648, 2652, 2656, 2660, 2664). While blocks 2644, 2648 and 2652 show just one user inquiry from a client, the present invention allows users to make numerous types of inquiries about one or more service contracts for one or more building sites using steps not shown in FIG. 26.

FIG. 27 provides another exemplary overview of a preferred embodiment of the present invention. As shown, the process of the present invention generally provides a customer web portal comprising a database for storing service information about a plurality of building sites, though it is understood that some users of the present invention may only have one building site for which service information is stored in the database (block 2700). This web portal may be accessed by a client computer using the correct url to reach the customer web portal over a network (block 2704). Once a user has accessed the web portal, general service information about the user's one or more building sites may be provided to a client and displayed on a client display (block 2708). The user may then opt to request information about service contract information, and may make a request using the client to obtain information from the database in the customer web portal to display the information on the client display (block 2712). The information may then be provided to a client and displayed on a client display after the request is received by the customer web portal (block 2716).

The user then has several options for obtaining service information for one or more building sites (2720, 2724, 2728, 2732, and 2736). One option the user has is to make an inquiry to the web portal, using a client, about service call type information (block 2720). For example, using the present invention, the user can generate information about pending or completed corrective maintenance tasks or information about pending or completed corrective maintenance tasks. The resulting information may be received by a client and displayed on a client display (block 2740).

Another option a user has is to obtain service information about a particular building site or group of sites (block 2724). For example, for a university campus having a plurality of buildings, the user may want to obtain service information about a science building in which there is an HVAC system and equipment for laboratory fume hoods, as well as other types of systems being maintained, such as the building's fire safety system. This information can then be received by a client and displayed on a client display (block 2744).

Still another option the user has is to make an inquiry about service information about different types of building systems, such as HVAC systems, mechanical systems, security systems or other types of systems (block 2728). For example, a user may want to obtain service information about HVAC systems in different buildings to determine how well the HVAC systems are functioning. The resulting information may then be provided to a client and displayed on a client display (block 2748).

Yet another option the user has to is to make an inquiry about the call status of service activities (block 2732). For example, the user may only want to view the status of service requests that are pending. The resulting information may then be provided to a client and displayed on a client display (block 2752).

Still another option the user has is to make an inquiry about the status of a service order (block 2736). The resulting information may then be provided to a client and displayed on a client display (block 2756).

Using the present invention, the user has an unlimited number of ways in which to obtain service contract information, which may include service order information, information about equipment being services including, but not limited to, technical diagrams, and one or more building sites covered under one or more service contracts (blocks 2760-2796). While blocks 2760, 2764, 2768, 2772 and 2778 show just one user inquiry from a client, the present invention allows users to make numerous types of inquiries about one or more service contracts for one or more building sites using steps not shown in FIG. 27.

FIG. 28 provides another exemplary overview of a preferred embodiment of the present invention. As shown, the process of the present invention generally provides a customer web portal comprising a database for storing service information about equipment located at a plurality of building sites, though it is understood that some users of the present invention may only have one building site for which equipment information is stored in the database (block 2800). This web portal may be accessed by a client computer using the correct url to reach the customer web portal over a network (block 2804). Once a user has accessed the web portal, general information, including service information, about one or more pieces of equipment may be provided to a client and displayed on a client display (block 2808). The user may then opt to request more detailed equipment information using a client to obtain information from the database in the customer web portal to display the information on the client display (block 2812). The information may then be displayed on a client display after the request is received by the customer web portal (block 2816).

The user then has several options for obtaining equipment information for one or more building sites (2820, 2824, 2828 and 2832). One option a user has is to request equipment information for one or more building sites (block 2820). The information can then be provided to a client and displayed on a client display (block 2836).

Another option a user has is to request information about an individual piece of equipment, or like pieces of equipment (block 2824). For example, a user may want to obtain service information about a client workstation in a HVAC control system for a particular building site. The information can then be provided to a client and displayed on a client display (block 2840).

Yet another option a user has is to request information about location of equipment in one or more building sites (block 2828) The information can then be provided to a client and displayed on a client display (block 2844).

Still another option a user has is to request information about a system a piece of equipment is associated with (block 2832). The resulting information can then be provided to a client displayed on a client display (block 2848).

Using the present invention, the user has an unlimited number of ways in which to obtain service information about equipment, including, but not limited to information about a particular piece of equipment, the service history for a piece of equipment, service agreements pertaining to equipment, and the site and location of the equipment within a site (blocks 2852-2880). While blocks 2852, 2856, 2860 and 2864 show just one user inquiry from a client, the present invention allows users to make numerous types of inquiries about one or more pieces of equipment for one or more building sites using steps not shown in FIG. 28.

FIG. 29 provides still another exemplary overview of a preferred embodiment of the present invention. As shown, the process of the present invention generally provides a customer web portal comprising a database for storing service information about equipment located at a plurality of building sites, though it is understood that some users of the present invention may only have one building site for which equipment information is stored in the database (block 2900). This web portal may be accessed by a client computer using the correct url to reach the customer web portal over a network (block 2904). Once a user has accessed the web portal, general information, including service information, about one or more pieces of equipment may be provided to a client and displayed on a client display (block 2908). The user may then opt to request more detailed equipment information using a client to obtain information from the database in the customer web portal to display the information on the client display (block 2912). The information may then be provided to a client and displayed on a client display after the request is received by the customer web portal (block 2916). The user then may select an individual building site for which the user wishes to obtain service activity information (block 2920). This information is then provided to a client and displayed on a client display (2924). The user then has several options for obtaining equipment information for obtaining service information about an individual building site (2928, 2932, 2936 and 2940).

One option the user has is to inquire about individual service orders for a site (block 2928). The resulting information is provided to a client and displayed on a client display (block 2940). Another option the user has is to inquire about the status of service activity at an individual site (block 2932). For example, the user may want information about all of the open or closed service requests for a site. The resulting information is provided to a client and then displayed on a client display (block 2944).

Yet another option a user has is to request information about the types of services being conducted at a building site (block 2934). For example, the user may want a breakdown of service information organized by preventive service activity or corrective service activity. The resulting information is provided to a client and displayed on a client display (block 2948).

Still another option a user has is to request information about different types of systems at a building site (block 2938). For example, a user may request service information about a type of system located at a particular building site.

The resulting information is provided to a client and shown on a client display (block 2952).

Using the present invention, the user has an unlimited number of ways in which to obtain service information about individual building sites. The flow chart shown in FIG. 29 merely illustrates an exemplary process of obtaining service information about an individual building site.

FIG. 30 provides yet another exemplary overview of a preferred embodiment of the present invention. As shown, the process of the present invention generally provides a customer web portal comprising a database for storing operational data about the performance of a plurality of building systems located within one or more building sites and for storing service activity information for one or more building sites though it is understood that some users of the present invention may only have one building site for which information is stored in the database (block 3000). This web portal may be accessed by a client computer using the correct url to reach the customer web portal over a network (block 3004).

Once a user has accessed the web portal, the user has the option of requesting information about service information about one or more building sites (block 3008). This information may be received by a client and displayed on a client display (block 3012). The user has the option then of obtaining further service information as illustrated in FIGS. 10-25.

Another option the user has once the web portal has been accessed is to request operational data about the performance of one of more systems, as discussed with respect to FIGS. 1-8 (block 3016). The resulting information may then be received by a client and displayed on a client display (block 3020). The user then has the option of obtaining further operational data.

In one embodiment of the present invention, after operational data has been provided to the user (block 3020), the user may request service related information (block 3000). The advantage of method is that a user may detect a problem with a system based upon the operational data being provided to a user. By being able to detect service information about the system, the user may more easily determine the problem with the system.

In an alternative, a user may be able to access operational data from a system or a piece of equipment (block 3016) after information is provided to the user about service activity for a system investigating the service activity for the system, equipment or the building site where the system or equipment is located (block 3012). In this way, a user can very quickly verify that the system is operating properly after service has been completed without having to go to the site where the system or equipment is located and testing the equipment to see if the equipment is operating properly.

As may be appreciated by those skilled in the art, various Internet links and pages may be accessed in any of a multitude of combinations and sequences. As such, the present description, for purposes of illustration only, is provided for one possible sequence of screen displays and data entry. It is to be appreciated that various other methods of entering and accessing information via the present invention and the CWP may be utilized without departing from the spirit or scope of the present invention. While the present invention has been illustrated by the description of exemplary processes and system components, and while the various processes and components have been described in considerable detail, applicants do not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicants' general inventive concept.

We claim:

1. A computer implemented method for displaying information about a service activity for equipment located at a plurality of building sites:

providing a web portal comprising a database, and storing service activity information, about a plurality of pieces of equipment operatively connected to different types of systems located at distributed building sites, in said database;

receiving a user request from one or more clients to send said service activity information;

determining which service activity information is implicated by said user request;

sending said service activity information to a client and sending graphic images about at least one of the plurality of pieces of equipment such that the graphic image of the at least one of the plurality of pieces of equipment includes highlighting on the image of the at least one of the plurality pieces of equipment where the equipment requires service.

2. The method according to claim 1, further comprising receiving a client request to display information about a piece of equipment, and sending said information about a piece of equipment such that it is capable of being displayed on a client display.

3. The method according to claim 1, further comprising I receiving client request to display information about service activity for a piece of equipment, and sending said service activity information for a piece of equipment such that it is capable of being displayed on a client display.

4. The method according to claim 1, further comprising receiving a user request to display information about a service contract relevant to a piece of equipment, and sending said information about a service contract relevant to a piece of equipment such that it is capable of being displayed on a client display.

5. The method according to claim 1, further comprising receiving a user request to display information about the service history for a piece of equipment, and sending said service history for a piece of equipment such that it is capable of being displayed on a client display.

6. The method according to claim 1, further comprising receiving a user request to display information about scheduled services for a piece of equipment, and sending said information about scheduled services for a piece of equipment such that it is capable of being displayed on a client display.

7. The method according to claim 1, wherein said service activity information includes information about the building site where the equipment is located, and information about the equipment's location in said building site.

8. The method according to claim 1, further comprising receiving a client request for information about a service order for a piece of equipment, and sending said information about a service order for a piece of equipment such that it is capable of being displayed on a client display.

9. The method according to claim 1, wherein the different types of systems located at a plurality of building sites are selected from the group consisting of HVAC systems, fire safety systems, security systems and mechanical systems.

10. The method according to claim 1, further comprising sending information about the status of a service contract associated with a piece of equipment.

11. The method according to claim 1, further comprising sending information about the service performed under the service contract associated with a piece of equipment.

12. The method according to claim 1, further comprising sending information about a system a piece of equipment is associated with.

13. The method according to claim 1, further comprising sending the status of a service contract associated with a piece of equipment.

\* \* \* \* \*